(12) United States Patent
Sadabadi et al.

(10) Patent No.: US 11,633,735 B2
(45) Date of Patent: Apr. 25, 2023

(54) HYBRID MODULAR THIN FILM MICROFLUIDIC MICROWAVE SENSING APPARATUS, SYSTEMS, AND METHODS

(71) Applicants: UTI Limited Partnership, Calgary (CA); The Governors of the University of Alberta, Edmonton (CA)

(72) Inventors: Hamid Sadabadi, Edmonton (CA); Mohammad Hossein Zarifi, Kelowna (CA); Mojgan Daneshmand, Edmonton (CA); Amir Sanati-Nezhad, Calgary (CA)

(73) Assignees: UTI Limited Partnership, Calgary (CA); The Governors of the University of Alberta, Edmonton (CA)

( * ) Notice: Subject to any disclaimer, the term of this patent is extended or adjusted under 35 U.S.C. 154(b) by 415 days.

(21) Appl. No.: 16/641,498

(22) PCT Filed: Aug. 24, 2018

(86) PCT No.: PCT/CA2018/051021
§ 371 (c)(1),
(2) Date: Feb. 24, 2020

(87) PCT Pub. No.: WO2019/036812
PCT Pub. Date: Feb. 28, 2019

(65) Prior Publication Data
US 2021/0129141 A1 May 6, 2021

Related U.S. Application Data

(60) Provisional application No. 62/549,467, filed on Aug. 24, 2017.

(51) Int. Cl.
| | | |
|---|---|---|
| B01L 3/00 | (2006.01) | |
| G01F 1/38 | (2006.01) | |
| G01N 22/00 | (2006.01) | |

(52) U.S. Cl.
CPC ........ B01L 3/502715 (2013.01); G01F 1/383 (2013.01); G01N 22/00 (2013.01);
(Continued)

(58) Field of Classification Search
CPC ....... B01L 3/502715; B01L 2300/0663; B01L 2300/0816; B01L 2300/0887; G01F 1/383;
(Continued)

(56) References Cited

U.S. PATENT DOCUMENTS 7,330,271 B2 * 2/2008 Frick ................. G01K 5/72
 356/480
9,163,965 B2 * 10/2015 Fouillet ................ G01F 1/38
(Continued)

FOREIGN PATENT DOCUMENTS

DE 102015210984 A1 12/2016
WO 2017030512 A1 2/2017

OTHER PUBLICATIONS

International Search Report; Canadian Intellectual Property Office; International Application No. PCT/CA2018/051021; dated Nov. 22, 2018; 4 pages.
(Continued)

Primary Examiner — Rebecca C Bryant
(74) Attorney, Agent, or Firm — Taft Stettinius & Hollister LLP

(57) ABSTRACT

A sensor and method for use in measuring a physical characteristic of a fluid in a microfluidic system is provided. A microfluidic chip has a thin deformable membrane that separates a microfluidic channel from a microwave resonator sensor. The membrane is deformable in response to loading from interaction of the membrane with the fluid. Loading may be fluid pressure in the channel, or shear stress or surface stress resulting from interaction of the membrane (Continued)

with the fluid. The deformation of the membrane changes the permittivity in the region proximate the sensor. A change in permittivity causes a change in the electrical parameters of the sensor, thereby allowing for a characteristic of the fluid, such as flow rate, or a biological or chemical characteristic, to be measured. Also, a microwave sensor with improved sensitivity for characterizing a fluid in a microfluidic channel is provided. The sensor has a rigid and very thin layer, for example in the range of 10 um to 100 um, in the microfluidic chip allowing for the positioning of the sensor very close to the microfluidic channel, which enables very high resolution sensing.

25 Claims, 13 Drawing Sheets

(52) U.S. Cl.
CPC .................. *B01L 2300/0663* (2013.01); *B01L 2300/0816* (2013.01); *B01L 2300/0887* (2013.01)

(58) Field of Classification Search
CPC ......... G01F 1/34; G01N 22/00; G01L 9/0001; G01L 1/00
See application file for complete search history.

(56) References Cited

U.S. PATENT DOCUMENTS

| 2004/0237657 | A1 | 12/2004 | Xie et al. | |
|---|---|---|---|---|
| 2015/0292880 | A1* | 10/2015 | Peter | G01J 3/26 356/480 |
| 2016/0091544 | A1 | 3/2016 | Daneshmand et al. | |
| 2016/0145555 | A1 | 5/2016 | Ingber et al. | |
| 2016/0371835 | A1 | 12/2016 | Grbic et al. | |
| 2017/0001194 | A1 | 1/2017 | De Wijs et al. | |
| 2022/0009764 | A1* | 1/2022 | Zhou | B81B 3/0027 |

OTHER PUBLICATIONS

Written Opinion of the International Searching Authority, Canadian Intellectual Property Office; International Application No. PCT/CA2018/051021; dated Nov. 22, 2018; 4 pages.
Abbasi et al., "Real-Time Non-Contact Integrated Chipless RF Sensor for Disposable Microfluidic Applications," IEEE Journal of Electromagnetics, RF and Microwaves in Medicine and Biology, Nov. 2019, 10 pages.
Alfadhel et al., "Magnetic Nanocomposite for Biomimetic Flow Sensing", Lab on a Chip, Aug. 2014, vol. 14(22), pp. 4362-4369.
Attia et al., "Soft Microflow Sensors", Lab on a Chip, Jun. 2009, vol. 9(9), pp. 1213-1218.
Bou-Maroun et al., "Feasibility of a Microwave Liquid Sensor Based on Molecularly Imprinted Sol-gel Polymer for the Detection of Iprodione Fungicide", Sensors and Actuators B Chemical, Jun. 2017, vol. 244, pp. 24-30.
Capulli et al., "Approaching the in Vitro Clinical Trial: Engineering Organs on Chips", Lab on a Chip, Sep. 2014, vol. 14, pp. 3181-3186.
Chen et al., "A Microfluidic Circulatory System Integrated With Capillary-assisted Pressure Sensors", Lab on a Chip, Feb. 2017, vol. 17(4), pp. 653-662.
Chen et al., "Generation of Oxygen Gradients in Microfluidic Devices for Cell Culture Using Spatially Confined Chemical Reactions", Lab on a Chip, Nov. 2011, vol. 11(21), pp. 3626-3633.
Chen et al., "Light-actuated High Pressure-resisting Microvalve for on-chip Flow Control Based on Thermo-responsive Nanostructured Polymer", Lab on a Chip, Aug. 2008, vol. 8(7), pp. 1198-1204.
Cheri et al., "Measurement and Control of Pressure Driven Flows in Microfluidic Devices Using an Optofluidic Flow Sensor", Biomicrofluidics, Oct. 2014, vol. 8(5), p. 054123.
Cheri et al., "Real-time Measurement of Flow Rate in Microfluidic Devices Using a Cantilever-based Optofluidic Sensor", Analyst, Jan. 2014, vol. 139, pp. 431-438.
Chiou et al., "Deformation Analysis of a Pneumatically-Activated Polydimethylsiloxane (PDMS) Membrane and Potential Micro-Pump Applications", Micromachines, Feb. 2015, vol. 6(2), pp. 216-229.
Chong et al., "Active Droplet Generation in Microfluidics", Lab on a Chip, Jan. 2016, vol. 16(1), pp. 35-58.
Chung et al., "Multiplex Pressure Measurement in Microsystems Using Volume Displacement of Particle Suspensions", Lab on a Chip, 2009, vol. 9, pp. 3345-3353.
Collins et al., "Microfluidic Flow Transducer Based on the Measurement of Electrical Admittance", Lab on a Chip, Feb. 2004, vol. 4(1), pp. 7-10.
Conde et al., "Continuous Flow Generation of Magnetoliposomes in a Low-cost Portable Microfluidic Platform", Lab on a Chip, Dec. 2014, vol. 14(23), pp. 4506-4512.
Esch et al., "Organs-on-chips at the Frontiers of Drug Discovery", Nature Reviews, Drug Discovery, Apr. 2015, vol. 14(4), pp. 248-260.
Ezkerra et al., "Fabrication of SU-8 Free-standing Structures Embedded in Microchannels for Microfluidic Control", Journal of Micromechanics and Microengineering, Oct. 2007, vol. 17(11), pp. 2264-2271.
Grenier et al., "Integrated Broadband Microwave and Microfluidic Sensor Dedicated to Bioengineering," IEEE Transactions on Microwave Theory and Techniques, Dec. 2009, vol. 57 (12), pp. 3246-3253.
Hung et al., "Microfabricated Suspensions for Electrical Connections on the Tunable Elastomer Membrane", Applied Physics Letters, Dec. 2004, vol. 85(24), pp. 6051-6053.
International Patent Application No. PCT/CA2018/051021, International Preliminary Report on Patentability dated Feb. 25, 2020.
International Patent Application No. PCT/CA2018/051021, International Search Report and Written Opinion dated Nov. 22, 2018.
Kartalov et al.,"Electrical Microfluidic Pressure Gauge for Elastomer Microelectromechanical Systems", Journal of Applied Physics, 2007, vol. 102(8), pp. 084909.
Kim et al., "A Method for Dynamic System Characterization Using Hydraulic Series Resistance", Lab on a Chip, May 2006, vol. 6(5), pp. 639-644.
Konig et al., "Precise Micro Flow Rate Measurements by a Laser Doppler Velocity Profile Sensor With Time Division Multiplexing", Measurement Science and Technology, vol. 21(7), pp. 074005.
Kumar et al., "Microfluidic-integrated Biosensors: Prospects for Point-of-care Diagnostics", Biotechnology Journal, Nov. 2013, vol. 8(11), pp. 1267-1279.
Lien et al., "Microfluidic Flow Rate Detection Based on Integrated Optical Fiber Cantilever", Lab on a Chip, Nov. 2007, vol. 7(10), pp. 1352-1356.
Liu et al., "Electrofluidic Pressure Sensor Embedded Microfluidic Device: a Study of Endothelial Cells Under Hydrostatic Pressure and Shear Stress Combinations", Lab on a Chip, Mar. 2013, vol. 13(9), pp. 1743-1753.
Meng et al., "Microfluidic Generation of Hollow Ca-alginate Microfibers", Lab on a Chip, May 2016, vol. 16, pp. 2673-2681.
Mohammadi et al., "Real-Time Monitoring of *Escherichia coli* Concentration With Planar Microwave Resonator Sensor," Microwave and Optical Technology Letters, Feb. 2019, vol. 61 (11), pp. 2534-2539.
Mousavi Shaegh et al.,"A Microfluidic Optical Platform for Real-time Monitoring of pH and Oxygen in Microfluidic Bioreactors and Organ-on-chip Devices", Biomicrofluidics, Aug. 2016, vol. 10(4), p. 044111.
Nezhad et al., "PDMS Microcantilever-Based Flow Sensor Integration for Lab-on-a-Chip", IEEE Sensors Journal, Feb. 2013, vol. 13(2), pp. 601-609.
Noeth et al., "Fabrication of a Cantilever-based Microfluidic Flow Meter With NI Min—1 Resolution", Journal of Micromechanics and Microengineering, Jan. 2011, vol. 21(1), pp. 15007-15010.

(56) References Cited

OTHER PUBLICATIONS

Noeth et al., "Integrated Cantilever-Based Flow Sensors with Tunable Sensitivity for In-Line Monitoring of Flow Fluctuations in Microfluidic Systems", Sensors, Jan. 2014, vol. 14(1), pp. 229-244.
Noh et al., "Biosensors in Microfluidic Chips", Topics in Current Chemistry, Apr. 2011, vol. 304, pp. 117-152.
Sessoms et al., "Droplet Motion in Microfluidic Networks: Hydrodynamic Interactions and Pressure-drop Measurements" Physical Review. E, Statistical, Nonlinear, and Soft Matter Physics, Jul. 2009, vol. 80(1 Pt 2), pp. 016317.
Shao et al., "Integrated Microfluidic Chip for Endothelial Cells Culture and Analysis Exposed to a Pulsatile and Oscillatory Shear Stress", Lab on a Chip, Nov. 2009, vol. 9(21), pp. 3118-3125.
Stone et al., "Engineering Flows in Small Devices: Microfluidics Toward a Lab-on-a-Chip", Annual Review of Fluid Mechanics, Jan. 2004, vol. 36, pp. 381-411.
Su et al., "Configurations of Splitter/Combiner Microstrip Sections Loaded with Stepped Impedance Resonators (SIRs) for Sensing Applications", Sensors, Dec. 2016, vol. 16(12), pp. E2195.
Suter et al., "Label-free Quantitative DNA Detection Using the Liquid Core Optical Ring Resonator", Biosensors & Bioelectronics, Feb. 2008, vol. 23(7), pp. 1003-1009.
Trietsch et al., Pulmonary Artery Embolization for Refractory Hypoxemia Caused by Invasive Mucinous Adenocarcinoma, Journal of Thoracic Oncology, Feb. 2013, vol. 8(2), pp. e15-e16.
Wang et al., "Polydimethylsiloxane-integratable Micropressure Sensor for Microfluidic Chips", Biomicrofluidics, Sep. 2009, vol. 3(3), pp. 034105.
Yang et al., "Acoustophoretic Sorting of Viable Mammalian Cells in a Microfluidic Device", Analytical Chemistry, Nov. 2012, vol. 84, pp. 10756-10762.
Yi et al., "PDMS Nanocomposites for Heat Transfer Enhancement in Microfluidic Platforms", Lab on a Chip, Jul. 2014, vol. 14(17), pp. 3419-3426.
Zarifi et al., "A Non-contact Microwave Sensor for Monitoring the Interaction of Zeolite 13X With CO2 and CH4 in Gaseous Streams", Sensors and Actuators B: Chemical, Jan. 2017, vol. 238, pp. 1240-1247.
Zarifi et al., "Effect of Phosphonate Monolayer Adsorbate on the Microwave Photoresponse of TiQ2 Nanotube Membranes Mounted on a Planar Double Ring Resonator", Nanotechnology, Sep. 2016, vol. 27(37), pp. 375201.
Zarifi et al., "Selective Microwave Sensors Exploiting the Interaction of Analytes With Trap States in TiO2 Nanotube Arrays", Nanoscale, Jan. 2016, vol. 8(14), pp. 7466-7473.
Zarifi et al., "Particle Size Characterization Using a High Resolution Planar Resonator Sensor in a Lossy Medium", Sensors and Actuators B Chemical, Apr. 2016, vol. 234, pp. 332-337.
Zarifi et al., "Wide Dynamic Range Microwave Planar Coupled Ring Resonator for Sensing Applications", Applied Physics Letters, May 2016, vol. 108(23), pp. 023509.
Zhang et al., "A Self-bended Piezoresistive Microcantilever Flow Sensor for Low Flow Rate Measurement", Sensors and Actuators A Physical, Mar. 2010, vol. 158(2), pp. 273-279.
Zhang et al., "Highly Sensitive Microfluidic Flow Sensor Based on Aligned Piezoelectric Poly(Vinylidene Fluoride-trifluoroethylene) Nanofibers", Applied Physics Letters, Dec. 2015, vol. 107(24), pp. 242901.
Zhang et al., "Multisensor-integrated Organs-on-chips Platform for Automated and Continual in Situ Monitoring of Organoid Behaviors", Proceedings of the National Academy of Sciences of the United States of America, Mar. 2017, vol. 114(12),pp. E2293-E2302.
Zhao et al., "Injectable Stem Cell-Laden Photocrosslinkable Microspheres Fabricated Using Microfluidics for Rapid Generation of Osteogenic Tissue Constructs", Advanced Functional Materials, Feb. 2016, vol. 26, pp. 2809-2819.
Zhao et al., "Optofluidic Imaging: Now and Beyond", Lab on a Chip, Jan. 2013, vol. 13(1), pp. 17-24.
Zheng et al., "Micro Coulter Counters With Platinum Black Electroplated Electrodes for Human Blood Cell Sensing", Biomedical Microdevices, Apr. 2008, vol. 10(2), pp. 221-231.
Zhu et al., "2-D Micromachined Thermal Wind Sensors—A Review", IEEE Internet of Things Journal, Jun. 2014, vol. 1(3), pp. 216-232.

\* cited by examiner

HYBRID MODULAR THIN FILM MICROFLUIDIC MICROWAVE SENSING APPARATUS, SYSTEMS, AND METHODS

CROSS REFERENCE TO RELATED APPLICATIONS

This application claims the benefit of priority of U.S. Provisional Patent Application No. 62/549,467 filed on Aug. 24, 2017, which is incorporated herein by reference.

FIELD

The present disclosure relates generally to sensors for sensing properties of a fluid within a microfluidic channel, and more particularly to sensors comprising a microwave resonator.

BACKGROUND

Microfluidic techniques have been extensively used for efficient manipulation of fluid flow in microscale for biomedical research and analytical chemistry. The control of flow in microfluidic networks is crucial in certain applications, for example for cell sorting, cell collection, flow mixing, cell adhesion and culture, droplet manipulation and flow driving. Moreover, the flow rate may need to be accurately quantified to determine concentrations, for example a concentration of cells, and production of hollow microspheres, droplets, liposomes, and chitosan microfibers, etc. A slight change in flow rate may lead to a size variation in the products. To precisely handle fluids at the microscale, the real-time detection of flow rate in microfluidic environments is desired. Further, improved techniques for biological and chemical sensing in microfluidic environments are desired.

Recently, microwave planar resonator devices have demonstrated promising results for sensing applications. They operate based on the interaction of electric fields with materials in the near soundings of the sensor. The dielectric properties of materials (permittivity and conductivity) affect the electric field and consequently electrical properties of the resonator such as the resonant amplitude, resonant frequency and quality factor. The planar structure, simple fabrication process and robustness of microwave resonators make them attractive for a variety of different applications, such as liquid monitoring in oil-sand, gas sensing for environmental monitoring and studying nanomaterials and nanostructures. These microwave and impedance-based measurement systems have also measured the flow rate within channels and tubes but they have used the flow discontinuity in form of droplets or particles transported with respect to the support fluid. The utilization of such discontinuity is challenging for bioreactors and OOCs due to their harmful impact on cultured cells. All above, the existing on-chip integrated flow sensors are not suitable for miniaturized bioreactors and OOCs. There are yet challenges for the development of flow sensors compatible with complex microfluidic bioreactors and the long-term and real-time monitoring the flow rate with minimal limitations in system-level integration and full automation.

Improvements in sensors and sensing methods for use in microfluidic applications are desired.

The above information is presented as background information only to assist with an understanding of the present disclosure. No assertion or admission is made as to whether any of the above might be applicable as prior art with regard to the present disclosure.

SUMMARY

According to an aspect, the present disclosure is directed to an apparatus for sensing a fluid, comprising a microfluidic chip defining a microfluidic channel for receiving the fluid, the channel comprising a chamber, the chip having a deformable membrane disposed at the chamber and defining part of the channel, wherein the deformable membrane is outwardly deformable in response to loading from interaction of the membrane with the fluid, and a microwave resonator arranged to generate an electromagnetic field at the deformable membrane, the resonator spaced apart from the microfluidic chip and facing the deformable membrane thereby defining a gap between the resonator and the membrane to accommodate the outwardly deformation of the membrane.

In an embodiment, the deformable membrane is outwardly deformable in response to pressure or shear stress resulting from interaction of the membrane with the fluid.

In an embodiment, the deformable membrane is outwardly deformable in response to a pressure of the fluid within the channel.

In an embodiment, the apparatus further comprises an analyzer arranged to measure an electrical parameter of the microwave resonator in the presence of the generated electromagnetic field, where the measured electrical parameter varies in relation to an amount of deformation of the deformable membrane caused by the loading.

In an embodiment, the analyzer is further arranged to determine a physical characteristic of the fluid within the microfluidic channel based on the measured electrical parameter.

In an embodiment, the physical characteristic is a flow rate of the fluid within the channel.

In an embodiment, the physical characteristic is a chemical or biological characteristic of the fluid within the channel.

In an embodiment, the electrical parameter is resonance frequency of the resonator.

In an embodiment, the microfluidic chip comprises a first layer joined to a thin membrane layer, where the microfluidic channel is defined between the first layer and the thin membrane layer, and where the thin membrane layer forms the deformable membrane.

In an embodiment, the deformable membrane is comprised substantially of polydimethylsiloxane (PDMS).

In an embodiment, a width of the deformable membrane within the range of 1 mm to 10 mm.

In an embodiment, the deformable membrane has a thickness within the range of 10 μm to 150 μm.

In an embodiment, a ratio of a width of the deformable membrane to a thickness of the deformable membrane is within the range of 30:1 to 60:1.

In an embodiment, the gap between the resonator and the deformable membrane in a non-deformed state is within the range of 200 μm to 500 μm.

In an embodiment, the apparatus further comprises a second microwave resonator disposed proximate the microfluidic channel and away from the deformable membrane, and an analyzer arranged to measure an electrical parameter of the microwave resonator in the presence of the generated electromagnetic field, where the measured electrical parameter varies in relation to an amount of deformation of the deformable membrane caused by the loading, and the analyzer further arranged to measure a permittivity of the fluid within the channel using the second resonator.

In an embodiment, the analyzer is arranged to determine a flow rate of the fluid within the microfluidic channel based on the measured electrical parameter and the measured permittivity.

In an embodiment, the deformable membrane is outwardly deformable without blocking the channel.

In an embodiment, the microwave resonator is retained in position relative to the microfluidic chip without bonding.

According to an aspect, the present disclosure is directed to a method of sensing a fluid, the method comprising providing the fluid in a microfluidic channel of a microfluidic chip, the channel comprising a chamber, the chip having a deformable membrane disposed at the chamber and defining part of the channel, wherein the deformable membrane is outwardly deformable in response to loading from interaction of the membrane with the fluid, generating a microwave frequency electromagnetic field at the deformable membrane using a microwave resonator, the resonator spaced apart from the microfluidic chip and facing the deformable membrane thereby defining a gap between the resonator and the membrane to accommodate the outwardly deformation of the membrane, and measuring an electrical parameter of the microwave resonator in the presence of the generated electromagnetic field, where the measured electrical parameter varies in relation to an amount of deformation of the deformable membrane caused by the loading.

In an embodiment, the deformable membrane is outwardly deformable in response to pressure or shear stress resulting from interaction of the membrane with the fluid.

In an embodiment, the deformable membrane is outwardly deformable in response to a pressure of the fluid within the channel.

In an embodiment, the method further comprises determining a physical characteristic of the fluid within the microfluidic channel based on the measured electrical parameter.

In an embodiment, the physical characteristic is a flow rate of the fluid within the channel.

In an embodiment, the physical characteristic is a chemical or biological characteristic of the fluid within the channel.

In an embodiment, the electrical parameter is resonance frequency of the resonator.

In an embodiment, the microfluidic chip comprises a first layer joined to a thin membrane layer, where the microfluidic channel is defined between the first layer and the thin membrane layer, and where the thin membrane layer forms the deformable membrane.

In an embodiment, the deformable membrane is comprised substantially of polydimethylsiloxane (PDMS).

In an embodiment, a width of the deformable membrane within the range of 1 mm to 10 mm.

In an embodiment, the deformable membrane has a thickness within the range of 10 µm to 150 µm.

In an embodiment, a ratio of a width of the deformable membrane to a thickness of the deformable membrane is within the range of 301 to 601.

In an embodiment, the gap between the resonator and the deformable membrane in a non-deformed state is within the range of 200 µm to 500 µm.

In an embodiment, the method further comprises providing a second microwave resonator disposed proximate the microfluidic channel and away from the deformable membrane, and measuring a permittivity of the fluid within the channel using the second resonator, and using the measured permittivity and the measured electrical parameter to determine a physical characteristic of the fluid.

In an embodiment, the parameter of the fluid is a flow rate of the fluid within the microfluidic channel.

In an embodiment, the deformable membrane is outwardly deformable without blocking the channel.

In an embodiment, the microwave resonator is retained in position relative to the microfluidic chip without bonding.

According to an aspect, the present disclosure is directed to an apparatus for sensing a fluid, comprising a microfluidic chip defining a microfluidic channel for receiving the fluid, the chip having a thin layer defining part of the channel, the thin layer having a thickness within the range of 10 um to 100 um, and a microwave resonator arranged to generate an electromagnetic field at the thin layer, the resonator disposed proximate the thin layer.

In an embodiment, the resonator is disposed no more than 50 um from the thin layer.

In an embodiment, the resonator is disposed in physical contact with the thin layer.

In an embodiment, the apparatus further comprises an analyzer arranged to measure an electrical parameter of the microwave resonator in the presence of the generated electromagnetic field and the fluid within the channel.

In an embodiment, the microwave resonator is retained in position relative to the microfluidic chip without bonding.

The foregoing summary provides some aspects and features according to the present disclosure but is not intended to be limiting. Other aspects and features of the present disclosure will become apparent to those ordinarily skilled in the art upon review of the following description of specific embodiments in conjunction with the accompanying figures. Accordingly, the drawings and detailed description are to be regarded as illustrative in nature and not restrictive.

BRIEF DESCRIPTION OF THE DRAWINGS

Embodiments of the present disclosure will now be described, by way of example only, with reference to the attached Figures.

DETAILED DESCRIPTION

This disclosure generally relates to sensors for sensing properties of a fluid within a microfluidic channel, and more particularly to sensors comprising a microwave resonator.

In an aspect, the disclosure is directed to a sensor for use in detecting or measuring a flow rate of a fluid in a microfluidic environment. In an embodiment, the sensor may be used to measure a physical characteristic of the fluid, such as chemical composition, biological composition, concentration, presence of a type of molecule, biological cell or some other substance, etc. A microfluidic chip comprises a thin deformable membrane that separates a microfluidic channel from a microwave sensor. The deformable membrane is deformable relative to the chip in response to stress on the membrane as a result of fluid pressure and/or the interaction of fluid components with the membrane surface within the channel. The stress applied to the membrane as a result of fluid pressure, sometimes referred to herein as normal stress, is proportional to the flow rate of the fluid in the channel. The amount of deformation of the membrane, which increases as the stress to the membrane increases, changes the permittivity in the region proximate the sensor. A change in the permittivity results in a change in the electrical parameters of the sensor, for instance resonance frequency, thereby allowing for a physical characteristic, such as the flow rate of the fluid within the channel or some other characteristics to be measured or calculated.

In some embodiments, the sensor does not contact the fluid or intrude into the microfluidic channel.

In another aspect, the disclosure is directed to a microwave sensor with improved sensitivity, which may be achieved at least in part by locating the sensor very close to the microfluidic channel through the use of a very thin layer in the microfluidic chip. The thin layer separates a microfluidic channel from the microwave sensor. Locating the sensor in very close proximity to the fluid within the channel enables high resolution sensing.

Figure 1:
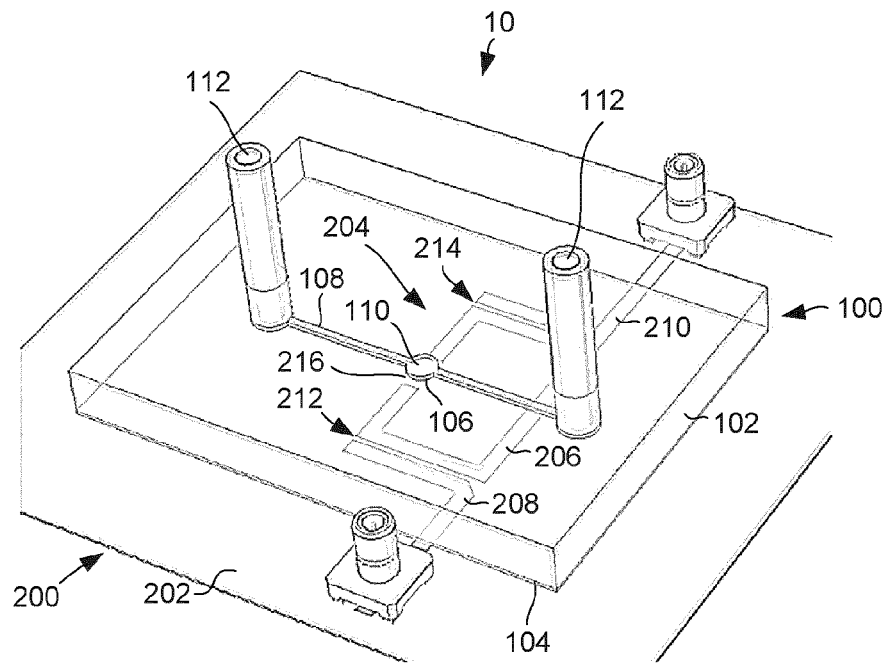
FIG. 1 is an example embodiment of a sensing apparatus according to the present disclosure.
Figure 3:
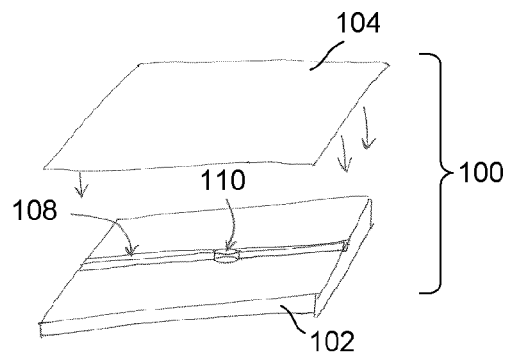
FIG. 3 is an exploded view of a microfluidic chip.

FIG. 1 is an example embodiment of a sensing apparatus 10 according to the present disclosure. Sensing apparatus 10 generally comprises a microfluidic device or chip 100 and a sensor device 200. Microfluidic chip 100 generally comprises a primary layer of material 102 joined to a thin membrane layer of material 104. Primary layer 102 defines a microfluidic channel 108 for receiving fluid. Channel 108 comprises a cavity or chamber 110, which is a widened portion of channel 108. In this embodiment, chamber 110 has a circular shape and is in the form of a cylinder. Channel 108 and chamber 110 may be etched or otherwise formed in a side of primary layer 102, and the open sides of channel 108 and chamber 110 may be sealed by thin membrane layer 104 when thin membrane layer 104 is joined to primary layer 102, as shown in FIG. 3. In FIG. 1, channel 108 and chamber 110 are formed into the side of primary layer 102 that faces sensor device 200. In FIG. 1, this is shown as the bottom side of primary layer 102, which is joined to thin membrane layer 104.

Figure 2:
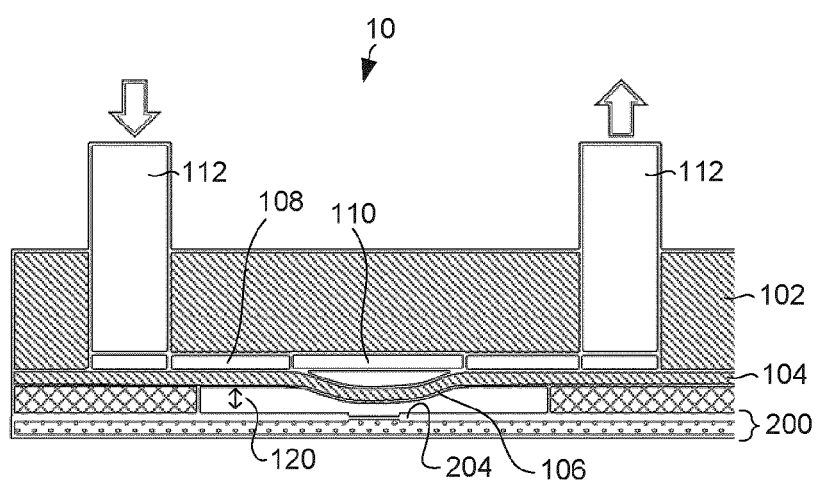
FIG. 2 is a cross sectional view of a sensing apparatus similar to the one of FIG. 1.

Thin membrane layer 104 functions as a deformable membrane 106 in the region of chamber 110 such that thin membrane layer 104 is deformable in response to mechanical loading of the membrane including deformation or deflection in response to a normal force as a result of the pressure of the fluid; or a tangential force as a result of wall shear stress as a result of the fluid movement; or normal or tangential forces as a result of chemical or biological interactions of the fluid components with the membrane surface. For example, shear stress and surface stress may be different types of stress or loading. Surface stress may be generated inside the membrane even if fluid molecules diffuse into the membrane. However, shear stress may only be applied to the top surface of membrane. Thin membrane layer 104 may deform in response to any of these different types of stresses or loading, whether it is normal stress, shear stress, and/or surface stress. When there is, for example, positive fluid pressure within channel 108 and chamber 110, deformable membrane 106 is configured to deform outwardly, meaning away from chamber 110 and chip 100. An outwardly deformation of membrane 106 is shown in FIG. 2, which is a cross sectional view of sensing apparatus 10. In an alternative example, the interaction of the fluid, or components of the fluid, with the membrane surface such a chemical or biological binding, create normal or tangential forces resulting in deformation or deflection of the membrane. In a further alternative example, the fluid, or components of the fluid, cause changes in membrane properties such as porosity, again resulting in deformation or deflection of the membrane.

In the present embodiment, sensor 10 operates without any blocking of channel 108, meaning that sensor 10 does not have any components that are located within channel 108. In other sensors, components within a channel typically affect the fluid flow within the channel, and thus affect the measurement of fluid properties like the flow rate or some fluid components such as molecules and particles adsorbed to the membrane surface. For example, microcantilever sensors introduce fluid noise to the circulatory network. Further, the present embodiment does not use or require the addition of a discontinuity phase such as particles or droplets into the fluid in order to measure the flow rate. The deformable membrane may have a planar shape in its unloaded state, or may include a convexity or a concavity in its unloaded state.

Accordingly, in some embodiments, the deformable membrane is simply designed as part of the microfluidic network design.

In present sensor 10, the amount of deformation is generally proportional to the amount of load applied to the membrane, meaning the deformation increases as the load (e.g. pressure) increases. The amount or rate of deformation that is caused by specific amounts of fluid pressure varies based on the specifications of the particular embodiment. Factors such as the size or width chamber 110, the thickness of deformable membrane 106, and the material of deformable membrane 106 typically affect the amount or rate of deformation. For example, wider membranes, thinner membranes, and softer membranes (e.g. made of softer or more elastic material) will typically deform more easily, meaning in response to a smaller load, such as lower pressure.

Figure 4:
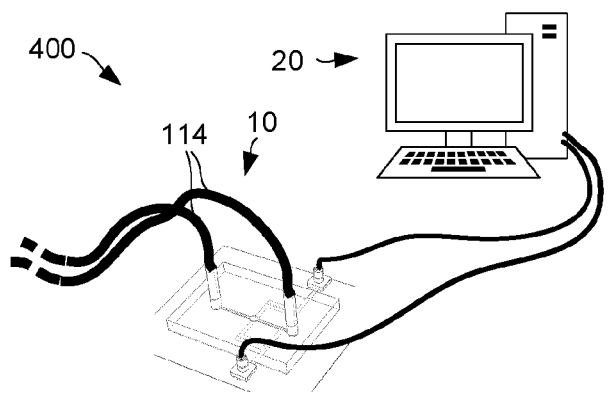
FIG. 4 is a sensing system.

Chip comprises a pair of inlet/outlet ports 112 in fluid communication with channel 108 such that there is a port 112 disposed on each side of chamber 110. Ports 112 may be connected to tubes 114, as shown in FIG. 4, for providing fluid flow through chip 100.

Again referring to FIG. 1, sensor device 200 of sensing apparatus 10 comprises a microwave resonator 204 arranged to generate an electromagnetic field in the region of deformable membrane 106 and chamber 110. In this embodiment, resonator 204 is a planar microstrip ring resonator having an open resonator loop portion 206.

Resonator 204 may be disposed on a substrate 202. Input and output signals to/from resonator 204 may be coupled to resonator 204 through two microstrip feed lines 208 and 210, respectively, and the capacitive coupling between lines 208, 210 and open loop 206. Feed line 208 may be a first port of the device (e.g. port 1), and line 210 may be a second port (e.g. port 2). A signal may be applied to at least one of lines 208, 210 to cause resonator 204 to operate at a resonant frequency. Furthermore, an output signal may be obtained at feed lines 208, 210 and transmitted elsewhere and possibly analyzed or processed. One or both of the applied signal and the output signal may be generated or received by any suitable computing device 20, such as a spectrum analyzer or a network analyzer, as shown in FIG. 4. Sensor 10 and computing device 20 may form part of a sensing system 400. Turning back to FIG. 1, the regions located between resonator loop 206 and each of feed lines 208, 210 are coupling gaps 212 and 214, respectively. Resonator loop 206 also comprises a slit or gap 216. For this particular resonator 204, the sensitive region of the resonator is right around gap 216.

A microstrip ring resonator structure is used in this embodiment for the microwave sensor due to its planar configuration and because it produces a single sensitive region at its gap 216.

Referring to FIG. 2, resonator 204 is spaced apart from microfluidic chip 100 and faces deformable membrane 106 thereby defining a gap 120 between resonator 204 and membrane 106 to accommodate outwardly deformation of membrane 106. In this embodiment, the gap is 400 um, but in other embodiments it may be any other suitable size, such as 380 um, 390 um, 410 um, 420 um, or any other suitable value above, between, or below these values. In some embodiments, the gap is within the range of 200 um to 500 um. Thin membrane layer 104 may act as an insulator layer between the electronic resonator 204 and the fluid to avoid galvanic contact. The insulator layer may also prevent issues associated with double-layer capacitances while preventing the degradation of electrodes and offering benefits for the measurement repeatability and sensor lifetime. One or more spacers 220 may be used to provide the separation between deformable membrane 106 and thin membrane layer 104, and resonator 204. Spacers 220 may function as insulators, and may retain the chip 100 in position relative to sensor device 200. Further, spacers 220 may prevent contamination of thin membrane layer 104 as a result of contact with resonator 204 or substrate 202. Microwave resonator 204 is retained in position relative to microfluidic chip 100 with a releasable connection, for example without bonding. This allows for a first microfluidic chip to be easily removed from resonator 204 and replaced with a second microfluidic chip. This enables the resonator to be used with multiple different microfluidic chips. For example, a used microfluidic chip may be removed and discarded, and replaced with a new chip. A releasable connection may be achieved in any suitable way. In an embodiment, it may be a thin layer of spacers surrounding the edges of contact between chip 100 and sensor device 200. In an embodiment, between chip 100 and sensor device 200 may be aligned using fasteners such as bolts or screws. In an embodiment, chip 100 may be placed on a sliding liquid like oil. The liquid may be placed on a groove surrounding the edge of contact between chip 100 and sensor device 200. In this way, the position of chip 100 may be easily adjusted, aligned and relocated over sensor device 200. In other embodiments, however, resonator 204 or substrate 202 may be fixedly connected to chip 100, for example through bonding or with adhesive.

As previously mentioned, sensing apparatus 10 may be used to sense, detect, or measure a physical characteristic of a fluid, such as flow rate, concentration, chemical composition, etc. in a microfluidic channel. The sensing may be performed in a noncontact and nonintrusive manner, meaning the sensor does not require any contact with the fluid. The sensing may be done in real-time. The load caused by the interaction with the fluid flowing through microfluidic channel 108 passing over deformable membrane 106 deforms membrane 106. The deformation of membrane 106 alters the permittivity and conductivity over the sensitive zone of the microwave resonator 204 and enables high-resolution detection or measuring of a physical characteristic of the fluid, such as flow rate or concentration of certain composition of the flowing fluid interaction selectively with the membrane in microfluidic channel 108 using a noncontact microwave electromagnetic field. Sensor 10 is positioned at bottom of microfluidic channel 108, meaning just adjacent and facing deformable membrane 106 as shown in FIG. 2, where the flow rate right at the surface of deformable membrane 106 within channel 108 is zero and therefore its deformation is independent from the parabolic nonlinear flow profile over deformable membrane 106.

According to the electromagnetic field distribution in proximity of resonator 204, any deformation, for example bulging, of deformable membrane 106 changes the effective permittivity experienced by resonator 204, and as a result, alters electrical parameters of resonator 204 such as effective capacitance, resonant frequency, and resonant amplitude. The alteration of electrical parameters of resonator 204 may be used to determine a flow rate of the fluid in channel 108 or measure the concentration of certain compositions of fluids adhered to the surface of membrane 108.

In some embodiments, data for use in mapping measured electrical parameters, such as resonant frequencies or resonant amplitudes, to flow parameters may be predetermined and stored somewhere, for example in computing device 20. For example, the effective permittivity variation in microfluidic channel 108 may be traced as the frequency shift of microwave resonator 204. A given data set is typical for use with a sensor with particular specifications, such as size of microfluidic channel, size of deformable membrane, thickness and material of the deformable membrane, etc. since these parameters generally affect the mapping of electrical parameters to flow parameters (flow rates or concentration of a target composition of fluid). Also, a given data set is typical for use with a specific type of fluid or a fluids have the same permittivity since the permittivity of the fluid also usually affects the mapping of the electrical parameters to flow parameters. In some embodiments, this data may be in the form of pre-loaded calibration curves.

A decrease in load applied to the deformable membrane 106 as a results of its interaction with the fluid flowing through channel 108, 106, leads to an inwardly movement, meaning a retraction, of membrane 106 to its isovolumetric relaxation.

In the present embodiment, primary layer 102 and thin membrane layer 104 of chip 100 are formed of polydimethylsiloxane (PDMS), and are fabricated by plasma bonding of the two layers 102, 104. In some embodiments, one or both of layers 102, 104 may be comprised substantially of PDMS, meaning at least 50% PDMS. In other embodiments, one or both of layers 102, 104 may be made of or comprise any other suitable materials including biocompatible polymers.

In this embodiment, PDMS material is chosen for the microfluidic system due to its exclusive features related to biomedical applications including biocompatibility, gas permeability, deformability and chemically inert function. Also PDMS can easily attach to glass and other PDMS layers to make multilayer complex microfluidic devices. It is also a user-friendly material due to its adaptability for creating any type of geometries and thicknesses using replica molding and soft lithography technologies. PDMS is also a low-loss microwave transparent. The present sensor 10 is fabricated with a hybrid low-cost technique which combines the PDMS soft lithography and the printed circuit board (PCB) fabrication processes. The permanent deflection of the membrane deflection under the flow condition in combination with the low stiffness of the PDMS membrane result in a high-performance fluid sensor with low power consumption and capability of noncontact detection of the fluid parameters. No extra on-chip integration of optical or electronic components is required which simplifies the miniaturization, integration and handling.

Further, the size of the deformable membrane 106 at the chamber 110 is dictated by the size of chamber 110. The size of the deformable membrane 106 may be any suitable size, such as 1 mm, 1.5 mm, 2 mm, 2.5 mm, 3 mm, 10 mm, or any other suitable value above, between, or below these values. The thickness of thin membrane layer 104 forming deformable membrane 106 may be any suitable value, such as 90 um, 100 um, 110 um, within the range 10 um to 200 um, within the range of 100 um to 150 um, or any other suitable value above, between, or below these values. The size and/or thickness of thin membrane layer 104 may be chosen based on particular testing requirements, such as range of flow rate, type of fluid, type of application, etc. In some embodiments, thin membrane layer 104 may be made more rigid for use in higher fluid pressure applications so that higher pressures are required to achieve the same amount of deformation. In an embodiment, thin membrane layer 104 may be coated with a stiffer material such as poly(methyl methacrylate) (PMMA) to enable detection of much higher flow rates for high pressure liquid and gas detection. In another embodiment, thin membrane layer 104 may be made thicker to increase its rigidity. In some embodiments, a ratio of a width of the deformable membrane to a thickness of the deformable membrane may be within the range of 30:1 to 60:1, or any other suitable range or value.

The width of microchannel 108 for which the flow rate is measured may be independent from the diameter or width of deformable membrane 106. This may enable a high flexibility to integrate the sensor along with a wide range of channel sizes and open up an avenue for measuring potentially the flow rate at several measurement points in a microfluidic network, applicable to estimate the pressure in the channels. An example size of channel 108 is 500 μm×40 μm×2 mm (width×height×length), but it is to be appreciated that channel 108 may have any other suitable dimensions.

Layers 102, 104 may be fabricated by molding the PDMS material on a mold.

Layer 102, which defines the microfluidic channel 108 design may be cast on the mold and baked in an oven. After curing, layer 102 is peeled off the mold. Thin membrane layer 104 that forms deformable membrane 106 may be fabricated by spinning a PDMS precursor on a silanized glass slide and cured. The spinning rotation speed may be adjusted to achieve desired thickness of thin membrane layer 104. Ports 112 for primary layer 102 may be punched to make holes for connecting chip 100 to metal connectors and tubing seals. Layers 102, 104 may then be aligned irreversibly and bonded with plasma treatment (e.g. Plasma Etch PE25) to form chip 100. Chip 100 may then be heated in an oven to strengthen the bonding.

Resonator 204 is operated in its half wavelength resonant mode and is coupled to feed lines 208, 210 port capacitively as previously described. To give a sense of the dimensions of resonator 204 in the embodiment of FIG. 1, the width of the conductive lines of resonator loop 206 and feed lines 208, 210 is 1.5 mm, resonator loop 206 is 29 mm, and coupling gaps 212, 214 are 0.3 mm. Resonator 204 operates at the resonant frequency of 4 GHz with quality factor of 200 where no PDMS layer is in its near vicinity. Of course, in other embodiments, resonator 204 may have any other suitable dimensions and/or operate at any other suitable resonant frequencies.

It is to be appreciated that the embodiment of FIGS. 1-3 is merely an example embodiment. In other embodiments, microfluidic chip 100 or resonator device 200 of sensing apparatus 10 may be configured with different structure or operated in a different manner. For example, chamber 110 may have a shape other than a circular or cylindrical shape. Further, in other embodiments, chip 100 may not include a chamber, but rather may be configured such that channel 108 is sufficiently wide to enable deformable membrane 106 to deform in response to interaction with fluid in channel 108. In some embodiments, resonator 204 may be other than a planar microstrip ring resonator, including but not limited to meander-type, loop-type, line-type, and triangular-type resonators, or a combination thereof in the form of a single resonator or multi resonators. Further, in some embodiments, thin membrane layer 104 that forms deformable membrane 106 may not necessarily have the same approximate length and width as primary layer 102 as it does in FIGS. 1 and 3. For example, thin membrane layer 104 may be smaller than primary layer 102. Of course, sensing apparatus 10 may differ from the embodiment of FIGS. 1-3 in ways other than those mentioned above.

Figure 5:
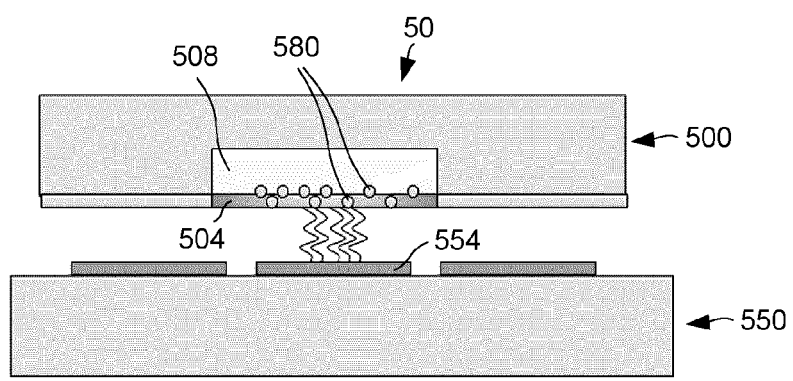
FIG. 5 is a cross sectional view of a sensing apparatus.

FIG. 5 is an illustration of a cross sectional view of a sensing apparatus 50 according to the present disclosure having microfluidic chip 500 and sensing device 550. In FIG. 5, the flow of fluid in microfluidic channel 508 either goes into the page or out of the page, which differs from the view in FIG. 2 where the fluid flows from left to right (or vice versa) in the figure. FIG. 5 illustrates the diffusion into or aggregation of the material under test 580 on the inner surface of thin membrane layer or into the membrane 504. The material under test is typically the fluid in channel 508 or material in the fluid. The squiggly lines represent a microwave electromagnetic field of resonator 554. Resonator 554 is configured for use in sensing a variation in the properties of thin membrane layer 504 at channel 508.

Figure 6:
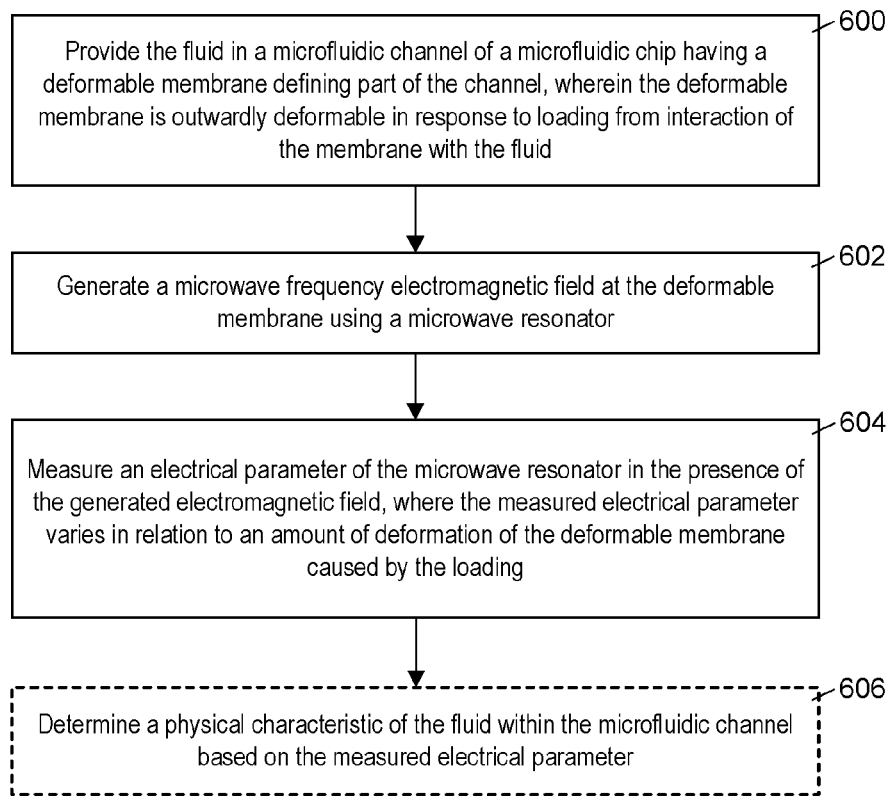
FIG. 6 is a process flow diagram showing at least some steps of a method of sensing a fluid.

FIG. 6 is a process flow diagram representing at least some steps or operations of an example method of sensing a fluid according to the present disclosure. The process starts at block 600, where the fluid is provided in a microfluidic channel of a microfluidic chip, where the channel comprises a chamber. The chip has a deformable membrane disposed at the chamber and defining part of the channel, wherein the deformable membrane is outwardly deformable in response to a pressure of the fluid within the channel.

The process proceeds to block 602, where a microwave frequency electromagnetic field is generated at the deformable membrane using a microwave resonator. The resonator is spaced apart from the microfluidic chip and faces the deformable membrane thereby defining a gap between the resonator and the membrane to accommodate the outwardly deformation of the membrane.

The process proceeds to block 604, where an electrical parameter of the microwave resonator is measured in the presence of the generated electromagnetic field. The measured electrical parameter varies in relation to an amount of deformation of the deformable membrane caused by the interaction with fluid.

In an optional step, the process proceeds to block 606, where a flow rate of the fluid within the microfluidic channel is determined based on the measured electrical parameter.

The process then ends.

Example

The following is a description of a non-limiting example of a microwave sensor for fluid sensing according to the present disclosure, as well as its operation.

Figure 7:
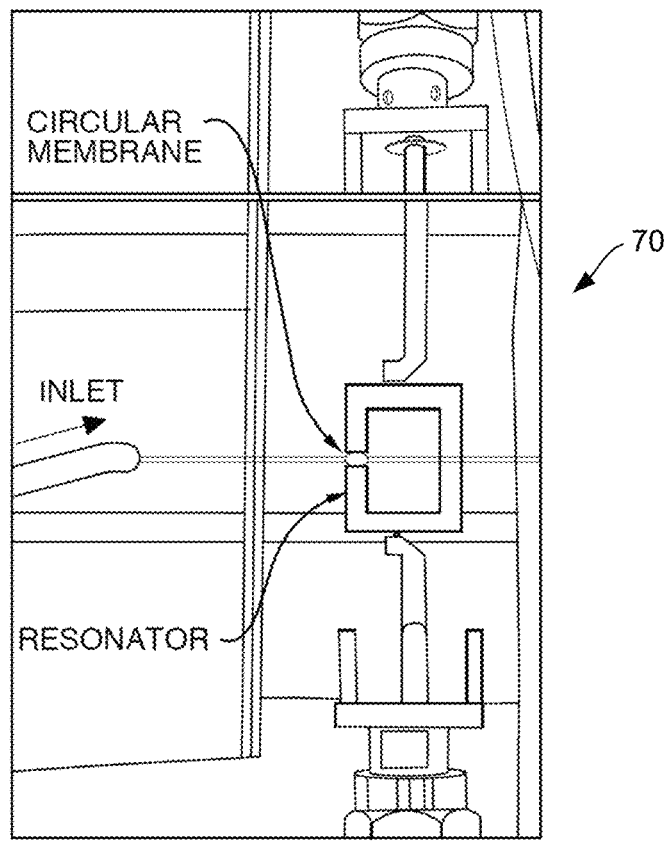
FIG. 7 is a photograph of a flow sensor used in an experiment.

FIG. 7 shows the example sensor 70, which is similar to the sensor shown and described with reference to FIGS. 1-3 above. In the experiment, two circular-shape membranes with a thickness of 100 pm and different diameter sizes of 3 mm ("larger" membrane) and 1.5 mm ("smaller" membrane) were tested.

Flow sensor 70 detects the flow rate with the resolution of 1 µl/min, with the detection limit of 0.5 µl/min, within the detection range of 0.5-300 µl/min. The high performance of this sensor is sourced from the high sensitivity of the integrated thin circular membrane to the pressure change resulted from the fluid flow; the specific design of microwave platform; and the presence of the thin membrane interfacing the electrodes and the fluid. Compared to other lab-on-chip compatible flow sensors, this flow sensor has the advantages of (a) providing a noncontact mode for integration to measure a wide range of flow rates in a reasonably linear response, and (b) high sensitivity and non-intrusiveness performance that can be highly beneficial for OOCs. The flow sensor demonstrated its long-term performance for monitoring the flow rate of cell culture medium stably and with compatibility with the environment of cell culture incubators. The simulation results confirmed that the flow rate functions noninvasively within micro-bioreactors, making it a harmless flow sensor for OOC platforms. While this experiment focused on the flow sensing specific for OOCs, the accurate and high-speed measurement of complex permittivity of fluidics such as ethanol and water is also demonstrated to show its broad applications for biomedical and energy sectors with the potential of in-line assembly to microfluidics of any kind.

In the sensor, the flow of liquid through the microchannel passing over the thin circular membrane deforms the membrane and alters the effective permittivity of the medium above the sensor.

Figure 8:
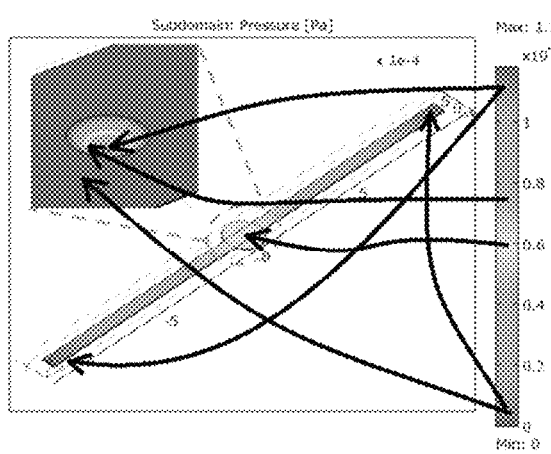
FIG. 8 is a diagram representing the pressure distribution within a channel and the deformation of a membrane layer.

The Reynolds number remains below 0.1 within the flow range of 1-300 µl/min tested in this work, therefore the laminar flow condition remains valid for the flow simulation purposes. Based on the simulation of Navier-Stokes and continuity equations as well as the force applied to the membrane under constant pressure, the deformation of the 3 mm diameter membrane with the thickness of 100 pm is represented in FIG. 8. FIG. 8 shows the pressure distribution within the channel and the deformation of the larger membrane (3 mm diameter) under the flow rate of 100 µl/min. The flow rate of 100 µl/min produced a flow pressure of 6 KPa over the membrane, resulted in a maximum deflection of 260 pm. The various arrows in FIG. 8 are intended to provide a general mapping from the scale onto the drawing.

Figure 9:
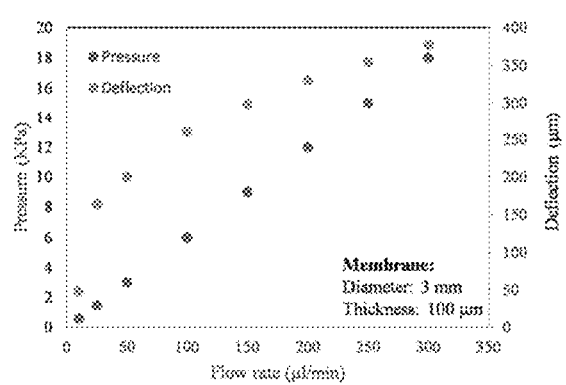
FIG. 9 is a graph of a numerical simulation of membrane deformation in response to different flow rates.

FIG. 9 shows a numerical simulation of the membrane deformation (diameter: 3 mm, thickness: 100 µm) in response to different flow rates in the range of 10-300 µl/min. Given the small gap of 400 µm devised between the electrodes surface and the circular membrane in the non-deformed state, the deformed membrane bulges (deforms) freely for the flow rate range of 0-300 µl/min, where the deflection remains below 400 µm. Again, the deformation of the larger membrane at the flow rate of 100 µl/min is shown in FIG. 8. For the flow rates of above 330 µl/min with the minimum deflection of 400 µm at the center of the larger membrane, the membrane was subjected to an upward force resulting from the physical contact of the membrane with the electrode surface.

The deflection of the thin membrane changes the effective permittivity experienced by the resonator, and consequently alters the effective capacitance of the resonator and the electrical parameters of the sensor such as resonant frequency and resonant amplitude. Since the microwave planar resonators are operational based on the dielectric properties of the medium over the sensitive region of the microwave sensor, the type of liquid inside the microfluidic channel impacts the frequency response of the resonator.

Figure 10:
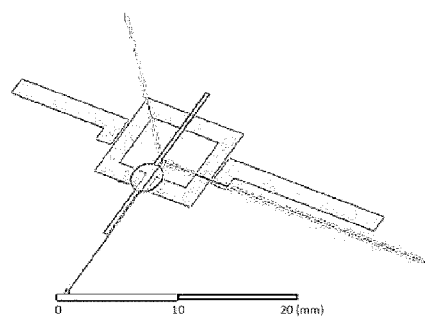
FIG. 10 is a representation of sensor implemented in high frequency structural simulation.
Figure 11:
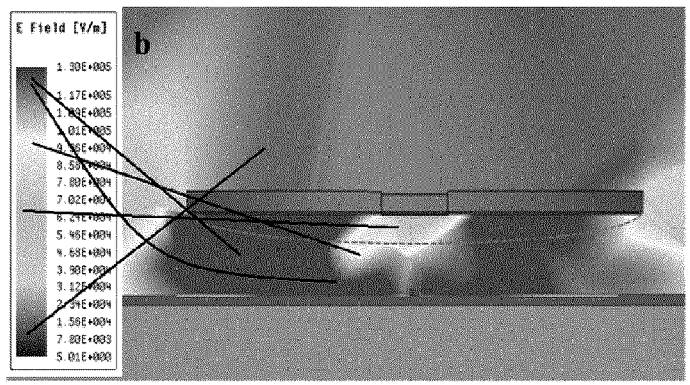
FIG. 11 is a side view representation of a simulation of the electric field distribution in front of the resonator in the sensitive region at the resonant frequency.
Figure 12:
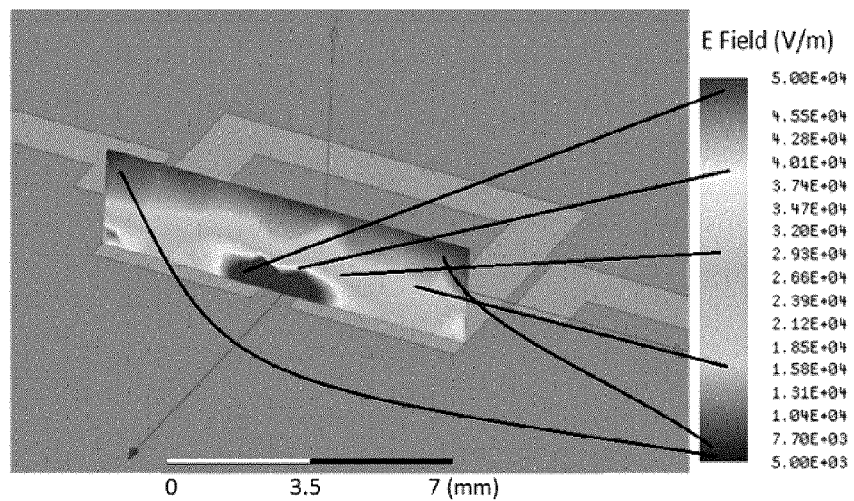
FIG. 12 is a perspective view representation of a simulation of the electric field distribution above the resonator.

FIGS. 10-14 generally relate to changes in electric field of the resonator versus deformation of the circular thin membrane. High frequency structural simulation (HFSS) was performed to simulate electric field simulation to demonstrate the field variation along the axis perpendicular to the surface of the resonator device. FIG. 10 shows the implemented microfluidic-microwave sensor in HFSS. FIG. 11 shows the electric field distribution over the resonator in the sensitive region at the resonant frequency. The various lines drawn in FIG. 11 are intended to provide a general mapping from the scale onto the drawing. According to the results, the electric field is 10 times smaller at 3 mm distance from the resonator sensor than its value on the resonator surface, as shown in FIG. 12. Again, the various lines drawn on FIG. 12 are intended to provide a general mapping from the scale onto the drawing. Therefore, the flow sensor can measure the flow rate noninvasively within microchannels. The HFSS simulation confirms that the sensor can measure the flow rate noninvasively within micro-bioreactors, making it a harmless flow sensor for OOC platforms.

Figure 13:
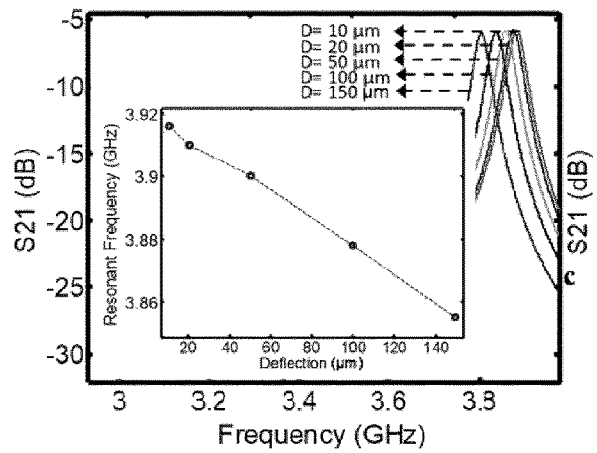
FIGS. 13 and 14 are graphs showing resonant profiles for different deflection values of a membrane with water content and with ethanol content, respectively.
Figure 14:
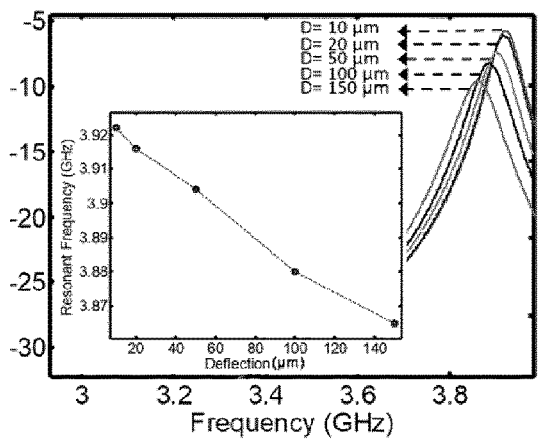

A simulation was also performed for two different liquids of water as the base material and ethanol as an arbitrary liquid, where water (c=79, tan δ=0.02) as shown in FIG. 13, and ethanol (c=16, tan δ=0.02) as shown in FIG. 14, were introduced into the microchannel. FIGS. 13 and 14 show the resonant profiles (S21) for different deflection values of the membrane with water content, and ethanol content, respectively. The HFSS simulation also illustrates that as the deformation increases, the variation for both liquids shows decreasing linear behavior, as shown in the insets of FIGS. 13 and 14. As expected, as the deformation increases, the effective permittivity increases and therefore the resonance frequency of the resonator decreases.

Figure 15:
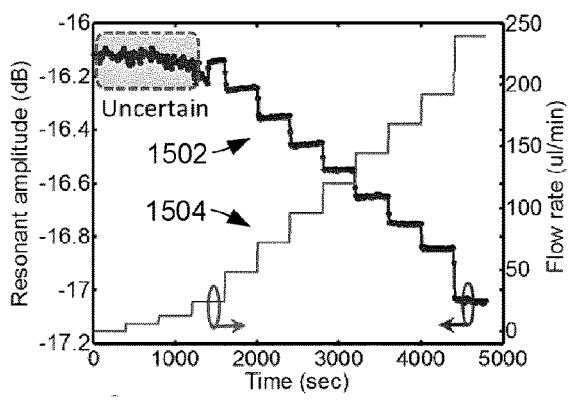
FIGS. 15 and 16 are graphs showing the behavior of a larger membrane, and a smaller membrane, respectively, integrated to the microwave resonator sensor in response to flow-rates versus time.
Figure 16:
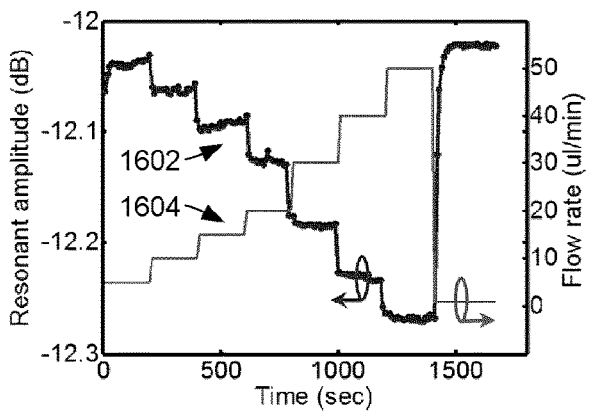
Figure 17:
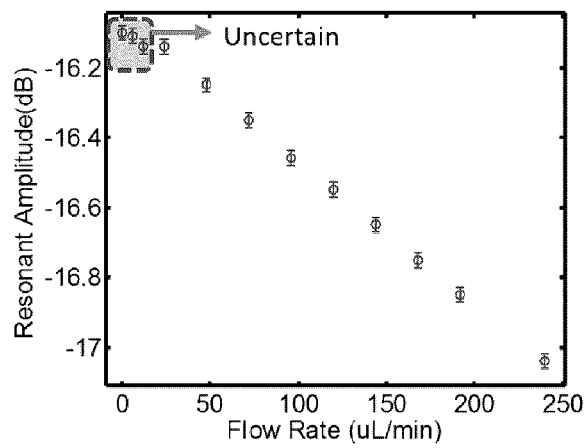
FIGS. 17 and 18 are graphs of the variation of resonant amplitude according to different flow-rates in a larger, and in a smaller, respectively, membrane-integrated microwave resonator.
Figure 18:
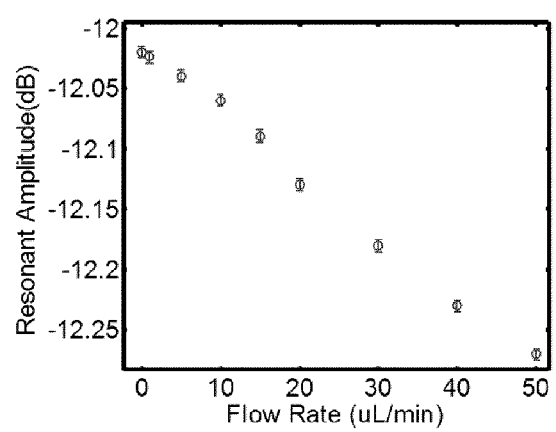

The performance of the flow sensor was examined from several aspects, such as sensing range, accuracy, response to flow fluctuation, leaking, reproducibility and long-term detection within the incubator, applicable for further integration into microfluidic-based bioreactors. Applying a pressure to the membrane results in its outwardly deformation. The release of pressure over the membrane leads to an inwardly movement to its isovolumetric relaxation, which is demonstrated by the electrical signal of the sensor, as shown in FIGS. 15-18. FIG. 15 shows the behavior of the larger membrane (3 mm diameter) integrated to the microwave resonator sensor in response to flow-rates versus time. The resonant amplitude is represented by line 1502 and the flow rate is represented by line 1504. FIG. 16 shows the behavior of the smaller membrane (1.5 mm diameter) integrated to the microwave resonator sensor in response to flow-rate versus time, where the resonant amplitude is represented by line 1602 and the flow rate is represented by line 1604. FIG. 17 shows the variation of resonant amplitude according to different flow-rates in the larger membrane-integrated microwave resonator (3 mm diameter). FIG. 18 shows the variation of the resonant amplitude with respect to different flow-rates in the smaller membrane-integrated microwave resonator (1.5 mm diameter).

Two circular-shape membranes with the thickness of 100 μm and different diameter sizes of 3 mm and 1.5 mm were tested in flow range of 0-250 μl/min. The size of the membrane may be, however, customized based on the flow-rate range to achieve a high level of precision and accuracy. As shown in FIG. 15, the measured resonant amplitude is scattered and not reliable and repeatable for the larger membrane (3 mm diameter) in the flow range below 12 μl/min whereas very repeatable and stable results are observed for flow rates higher than 12 μl/min. The transient measurements were repeated 5 times and results with associated error bars are shown in FIG. 17. The instability at low flow rates may be sourced from the high aspect ratio of the membrane (diameter:thickness is 60:1) as this instability was not detected for the smaller membrane (1.5 mm diameter). The smaller membrane demonstrated reliable performance with clearly distinguishable results at flow rates below 50 μl/min, as shown in FIGS. 16 and 18. The microwave sensor demonstrates a real-time and linear response with both membranes at the desired flow ranges.

Figure 19:
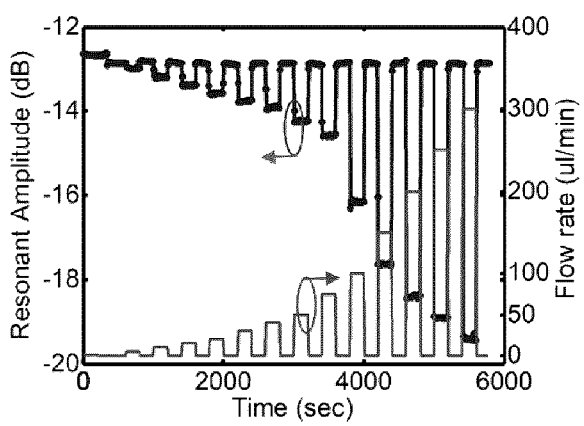
FIGS. 19 and 20 are graphs of resonant amplitude versus time, and resonant frequency versus time, respectively, of a resonator in a flow sensor.
Figure 20:
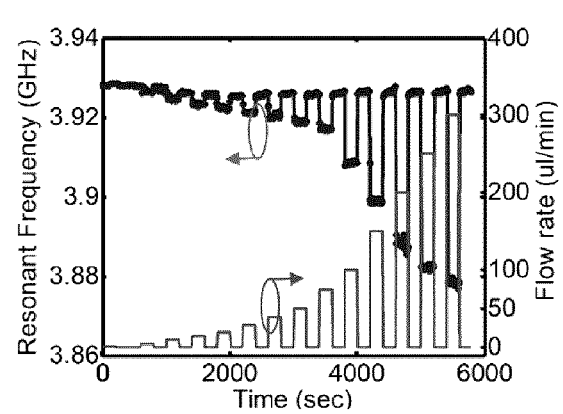
Figure 21:
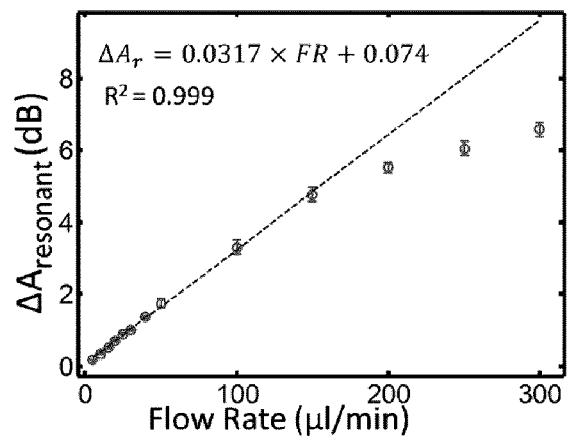
FIGS. 21 and 22 are graphs showing resonant amplitude, and resonant frequency, respectively, against flow rate associated with a fitting curve.
Figure 22:
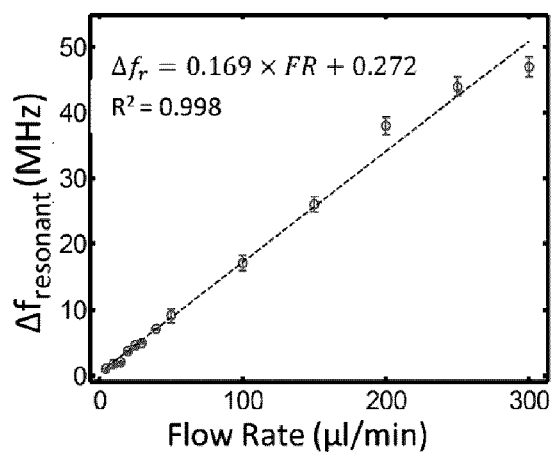

FIGS. 19-22 show the response of the flow sensor with the larger membrane (3 mm diameter) to different flow rates following a reset condition, meaning a stoppage of fluid flow and a return of the pressure in the channel to ambient pressure. In particular, FIG. 19 shows the transient response of resonant amplitude variation with respect to the flow rate change. FIG. 20 shows the transient response of resonant frequency variation with respect to the flow rate change. FIG. 21 shows the resonant amplitude against flow rate associated with a fitting curve. FIG. 22 shows the resonant frequency against flow rate associated with a fitting curve.

Both resonant amplitude and frequency of the sensor demonstrate variations during the flow against the zero-flow condition. As shown in FIGS. 19 and 20, the results are repeatable, robust and reliable for the membrane with a 3 mm diameter. The flow range was set to 1 to 300 μl/min. The settling time constant was extracted for resonant amplitude and resonant frequency response of the sensor using a curve fitting to the first order exponential equation for each flow rate. During the relaxation period (flow is zero), the time constant was 3+/−0.2 min. The time constant of the sensor response for the duration when the flow was set to a constant value is flow dependent which is an increasing function of flow rates.

Under the flow experiment, the sensor can detect a maximum flow of 300 μl/min and a minimum flow rate of 0.5 μl/min. The sensitivity of the sensor is defined as the frequency shift over flow variation and determined to be 169 kHz/(μl/min). This sensor demonstrated the ability to detect abrupt flow changes and monitor the flow inside the fluidic network. In the case of priority to the actuation time, the respond time of the sensor may be further improved by modifying the physical properties of the membrane. The 100 times reproducibility testing of the sensor under the flow rate of 5 μl/min in a 20 s/20 s (on/off) manner showed that this flow sensor may accurately and reliably measure the flow rate with the variation of less than 5%. The deformation of the membrane did not generate any bubble during the long-term performance of the sensor, which demonstrates its non-disruptive performance to the normal flow of fluids within the channel. Also the membrane in its free standing condition (in absence of the resonator) withstands the deformation of about 1.2 mm under the flow pressure before any occurrence of membrane breakage or leakage at the inlet. This demonstrates that the membrane thickness of 100 μm is a reliable thickness for the effective performance of sensor within the flow rate of 1-300 μl/min.

The experimental results showed that the flow sensor with the larger membrane (3 mm diameter) functions linearly within the flow rate of 1-150 μl/min, while the linear range response of the smaller membrane is within the 1-100 μl/min. The nonlinear response of the PDMS material under large deformation and non-uniform change of permittivity above the sensing site may contribute in nonlinear response of the resonator signal for the flow rates of above 150 μl/min. Moreover, the pick and place testing is also performed to assess the sensitive sensitivity to the alignment of microfluidic over that of resonator. The results showed that the pick and place testing has an error rate below 2% as long as the width of microchannel is less than the gap between the two electrodes.

It is noteworthy to mention that the delay on the response might be due to the fluidic damping factors of the fluidic network from the syringe site to the local sensing point as well as the damping properties of the detection system including the membrane and the electronic system. While the membrane deformation in this experiment is used for flow sensing, with some modification of the design and incorporation of several circular membranes along the channel, this membrane-based flow sensor may be used for non-contact and non-intrusive measurement of pressure and viscosity of fluids within microchannels. The dielectric constant of the media resulted from the iron concentration, polarization charge and double layer thickness may affect the measured microwave profile and parameters of the flow sensor.

Figure 23:
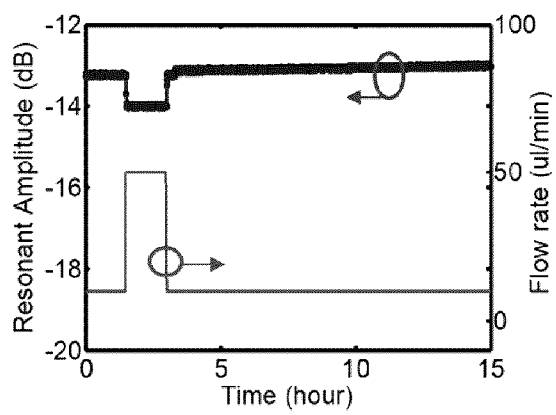
FIGS. 23 and 24 are graphs showing a transient response of the resonant amplitude variation, and the resonant frequency variation, respectively, with respect to flow rate change.
Figure 24:
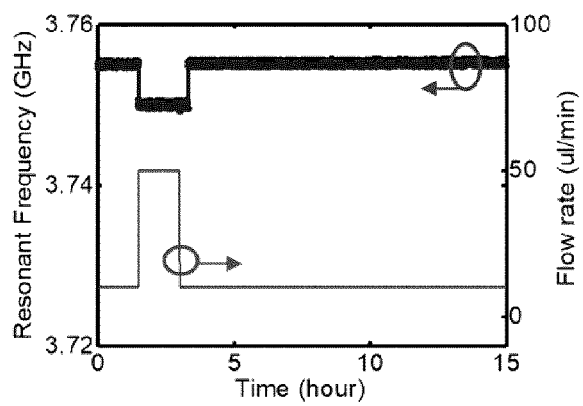

The long-term performance of the flow sensor in cell culture incubator was also examined. The flow sensor was placed inside the cell culture incubator (Thermo Fisher™) to examine its stability for long-term monitoring the flow rate in microbioreactors in 37 degrees C., 5% $CO_2$ environment and 100% relative humidity, and the flow rate was monitored for 15 hours continuously. The results show that the signal was stable with 2% error. The small signal drift at a few minutes of the detection may have been due to the effect of humidity fluctuation on the sensor performance. The initial flow rate was set to 10 μl/min for 100 min and then changes to 50 μl/min for 100 min. To demonstrate the repeatability of the measured results, the flow was set back to 10 μl/min for the rest of experiment (approximately 11 hours). The transient response of the microwave sensor for two flow rates is presented in FIGS. 23 and 24. In particular, FIGS. 23 and 24 show the response of the sensor to two different flow rates of 10 and 50 μl/min, respectively, in the incubator at a temperature of 37 degrees C., 5% $CO_2$, 100% relative humidity. FIG. 23 shows the transient response of the resonant amplitude variation with respect to flow rate change. FIG. 24 shows the transient response of the resonant frequency variation with respect to flow rate change.

While the flow sensor performance is validated for the flow rates of 1-300 μl/min, the flow sensor may be further modified by changing the dimensions of the membrane or coating stiffer materials like poly(methyl methacrylate) (PMMA) over the thin PDMS membrane to enable detection of much higher flow rates for high pressure liquid and gas detection. The thin layer made of PDMS material in the present experiment may be fabricated from other biocompatible polymers. However, changing any of these parameters may lead to a different operating flow ranges, and sensor resolution and sensitivity. Also incorporation of several of these membranes at different positions of microfluidic network or high-throughput fluid system enables time to time detection of flow rate and possibly the pressure at any desired channel network using the pick and place method. When designing the microsystem, users may decide the position on which the detection zone is placed to measure the localized flow by leaving the membrane along the desired channel. Also the detection range and sensitivity of the flow sensor developed in this work meet the requirement of OOCs but further improvement may be implemented to enhance the sensitivity and possibly reach the high-resolution sensing within the range of tens of nl/min achieved by SiN or SU8 cantilevers.

This experiment demonstrated a highly sensitive, non-contact and non-intrusive flow sensor based on integrated microwave-microfluidic technologies. The deformable membrane was fabricated in PDMS and was designed as part of the microfluidic network design. The integration of thin film membrane enabled monitoring of fluid behaviour. The membrane was designed such that different deformation occurs depending on the flow rate. Consequently, this behaviour was monitored using a planar microwave ring resonator. The flow sensor has a linear response in the range of 0-150 μl/min for the optimal sensor performance. The highest sensitivity is detected to be 0.5 μl/min for the membrane with the diameter of 3 mm and the thickness of 100 μm. Further optimization on the membrane diameter and thickness may enhance the sensitivity and detection limit. Compared to other on-chip flow sensors, this flow sensor is easy to fabricate, compatible with the multilayer soft lithography fabrication process of OOCs, without requiring much space. It also has the capability of integrability to high-throughput systems to measure the flow rate at several different points of interest with no extra complexity to the chip design or incorporation of bulky optical systems.

Specifics on the resonator and microfluidic chip used in the experiment are now described. The flow sensor consisted of a circular membrane that is integrated with a microchannel and placed on top of the sensitive region of the stand-alone microwave resonator. A microstrip ring resonator structure was employed and was operated in its half wavelength resonant mode.

The microfluidic chip was fabricated by plasma bonding of the two PDMS layers. The fluidic layers were fabricated by molding the PDMS material (10:1 weight ratio of prepolymer:curing agent) on SU8 mold using the established protocols. The thick PDMS layer that contains the microchannel design was cast on the mold and baked in an oven for 3 hours at 80 degrees C. After curing, the PDMS replica was peeled off from the SU8 mold. The thin PDMS layer that contains the thin circular membrane design was fabricated by spinning a PDMS precursor (10:1) on a silanized glass slide and cured for 3 hours at 80 degrees C. The spinning rotation speed was adjusted to achieve desired thickness of the coated PDMS layer. The inlet and outlet of the microchannel on the thick PDMS layer were punched (ID 1.5 mm) to generate holes for connecting the chip to metal connectors and tubing seals. The two PDMS layers were then aligned irreversibly and bonded with plasma treatment (Plasma Etch PE25) for 45 seconds at the power setting of 15 W. The assembly was then heated in the oven for 1 hour at 80 degrees C. to strengthen the bonding.

The width of the target microchannel for which the flow rate was measured may be independent from the diameter of the circular membrane flow sensor. This enables a high flexibility to integrate the sensor along with a wide range of channel sizes and opens up an avenue for measuring potentially the flow rate at several measurement points in a microfluidic network, applicable to estimate the pressure in the channels. For this experiment, the size of microchannel was fixed to 500 μm×40 μm×2 mm for width×height×length. Two different circular membranes with diameters of 1.5 mm and 3 mm were tested. Various thicknesses of PDMS ranging from 10-200 μm were examined but the membrane thickness of 100 μm was determined to be optimal as it is thin enough for high sensitive resonator function and thick enough to withstand the flow pressure generated for the desired range of flow rate. The microchannel was connected to a fluidic inlet linked to the syringe pump while the outlet was connected to the atmospheric pressure. The thin PDMS layer seals the microchannel and acts as an insulator layer between the electronic layer and the fluid to avoid the galvanic contact. The insulator layer also prevents issues associated with double-layer capacitances while preventing the degradation of electrodes and offering benefits for the measurement repeatability and sensor lifetime.

A simulation of membrane deformation versus flow rate is now described. To determine the effect of fluid-structure interaction on the deformation of circular PDMS membrane in a laminar Newtonian regime, three-dimensional, incompressible Navier-Stokes and continuity simulations were implemented using Comsol Multiphysics as follows:

$$\rho \frac{\partial u}{\partial t} + \rho(u.\nabla)u = -\nabla.[pI + \eta(\nabla u + (\nabla u)^T)] \qquad (1)$$
$$-\nabla.u = 0$$

Where ρ, η, u, and p are the fluid density, dynamic viscosity, velocity vector field and pressure, respectively. Generally, the structural deformation and deflection of the circular membrane resulting from the moving fluid may be calculated by the displacement-force relationship of an elastic membrane shown below:

$$F\tau = -n \cdot (-pI + \eta(\nabla u + (\nabla u)^\tau))$$ (2)

Where Fτ is fluid loading that consists of pressure and viscous forces and n is normal vector of the boundary. The first term on the right side of equation (2) is the pressure gradient extracted from the fluid simulation results. The second term is the viscous component of the force that depends on the dynamic viscosity and velocity of the fluid. However, given the large deformation of the PDMS membrane under the flow rate of 1-300 μl/min and viscoelastic properties of PDMS material for large deformations, the deflection of the membrane follows the large displacement equation experimentally validated for PDMS material according to the following:

$$w = 0.474 * \left[(1-v)\frac{Pr}{Eh}\right]^{\frac{1}{3}}$$ (3)

Where w is the maximum deflection of the membrane, r is the membrane radius, E and u are the Young's modulus and the Poisson's ratio of the membrane material, respectively, and h is the thickness of the PDMS membrane. The PDMS thin circular membrane is considered isotropic with estimated E and u values of ~800 kPa and 0.45. The velocity on the walls is zero in a laminar flow regime due to the dominant viscous force. The flow rate has a maximum value in the middle of the microchannel and is zero at the walls including the region next to the circular membrane since it is located at the bottom wall of the microchannel. The viscosity of ethanol, water and culture medium is 0.001 Pa·s, 8.9×10$^{-4}$ Pa·s, and 0.001 Pa·s, respectively. The viscosity of culture medium remains constant in ambient and culture incubator temperature.

Specifics relating to the microwave flow sensor fabrication are now described. The microwave sensor structure was an open-ended half wavelength ring resonator, fabricated on a high-performance microwave substrate from Rogers (RT/duroid 5880). The substrate had a thickness of 0.79 mm and electrical permittivity and loss factor of 2.2 and 0.0009, respectively. The microwave substrate had copper layers on the top and bottom surfaces as conductive layers with thickness of 35 pm. To transfer the resonator pattern onto the substrate, conventional low-cost printing circuit board technique using chemical etchant was used in room temperature. The implemented resonator had a microstrip structure with two input microstrip signal lines which were coupled electrically to the resonator loop. The microstrip structure had a width of 1.5 mm, the resonant loop of 29 mm and with the coupling gap of 0.3 mm between the signal line and the loop. The fabrication error was less than 5% for minimum features of 0.3 mm. The microwave resonator operated at the resonant frequency of 4 GHz with quality factor of 200 where no PDMS layer is in its near vicinity.

Simulating the change of electric field of the resonator in response to flow change is now discussed. To characterize interaction of the electric field of the resonator with the flow inside the microfluidic channel and the bulging (i.e. deformation) of the membrane, a three-dimensional (3D) model was implemented in high frequency structural simulation (HFSS) software as shown in FIG. 10. The cross section of the implemented sensor in HFSS is shown in FIG. 11. The deformable membrane was placed in the most sensitive region of the resonator, where the electric field is intense and has its maximum value. The electric field in front of the sensor and in a plane vertically aligned with the sensor surface is presented considering no liquid ($\varepsilon_r = 1$) within the microfluidic channel. The microfluidic channel layer was considered 400 pm above the sensor surface, where the electric field can interfere with the membrane deflection. The simulation parameters in HFSS software were set as: the maximum number of passes for adaptive solution equal to 30; maximum Delta S of 0.001; and a fast sweep type with the frequency span of 3-4 GHz with 2001 number of points. The simulation was performed in a vacuum box with the boundary condition of radiation for its walls. 50Ω lumped excitation ports are defined for two signal lines.

Flow testing of the sensor in the experiment is now discussed. To evaluate the sensing dynamic range and the accuracy of the measurement, a step flow profile was applied with the flow rate of 10-50 μl/min and 200-400 s of holding time, as shown in FIGS. 16, 19 and 20. To test the response of the sensor to flow fluctuations, flow pulses were induced in an increasing, decreasing or on/off manners using a syringe pump. The electrical signal for on and off states were recorded continuously to investigate the response time of the sensor to flow changes. The microwave frequency response was recorded for different flow rates following a zero-pressure (pump off). The data was automatically collected every 10 seconds using a LabView™ equipped vector network analyzer form National Instruments (VNA NI PXIe-1075). Although the response time of the flow sensor was much smaller than the 10 second collection period, a limitation was the data acquisition time required for the VNA and LabView for high precision measurements. All experiments were carried out at room temperature unless otherwise mentioned. To assess the performance of the flow sensor for biological applications, the Dulbecco's modified eagle medium (DMEM) was flowed into the microchannel over the membrane, and the coupled microfluidic-microwave system was placed inside the cell culture incubator with 37 degrees C. and 100% relative humidity (RH). The flow rate was altered within the corresponding flow range of 1-20 μl/min as used in a majority of microbioreactors and OOCs. The liquids were injected into the flow sensor by syringe pump (Harvard PHD 2000).

Other Aspects and Embodiments

Figure 25:
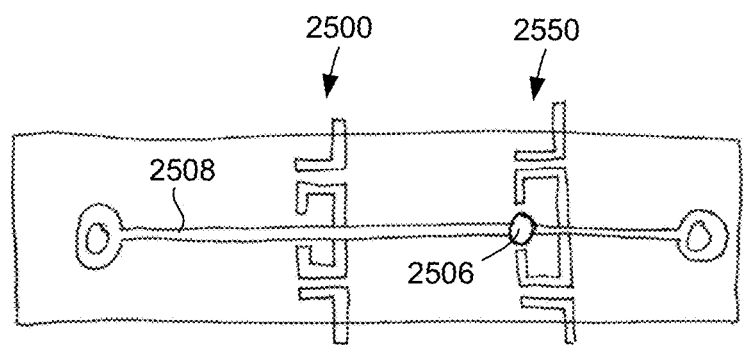
FIG. 25 is a sensing apparatus having two microwave resonator sensors for providing differential measurements.

FIG. 25 shows an embodiment according to the present disclosure comprising two microwave resonator sensors 2500, 2550. More generally, two or more microwave resonators may be used in series or parallel for differential measurements. Differential measurements may include measurements to compensate for the dielectric constant of the media, meaning the fluid within the channel. As shown in FIG. 25, a first resonator 2550 may be positioned to sense at deformable membrane 2506 while a second resonator 2500 may be disposed proximate microfluidic channel 2508 and away from deformable membrane 2506. The difference between the measured signals of the two resonators is essentially related only to the deformation effect of membrane 2506, thereby enabling for the measurement of the fluid parameters interacting with the membrane surface in channel 2508 independent from the dielectric constant of the media.

Although not shown in FIG. 25, a computing device such as an analyzer may arranged to measure an electrical parameter of first microwave resonator 2550 in the presence of the generated electromagnetic field, where the measured electrical parameter varies in relation to an amount of deformation of deformable membrane 2506 caused by the fluid pressure in channel 2508. The analyzer may further be arranged to measure a permittivity of the fluid within channel 2508 using second resonator 2500. The analyzer may be arranged to determine a flow rate of the fluid within microfluidic channel 2508 based on the measured electrical parameter and the measured permittivity.

According to another aspect, the present disclosure is directed to a microwave sensor with improved sensitivity achieved at least in part by locating the sensor very close to the microfluidic channel through the use of an ultra thin layer sealing the microfluidic chip. In this aspect, the thin layer is substantially rigid and thus is not deformable as is the membrane layer of the embodiments of FIGS. 1-3. This rigid layer sensor may be used to characterize the sample in the microfluidic channel, but is generally not adapted to measure or calculate a flow rate within the channel.

The ultra thin layer separates a microfluidic channel from the microwave sensor. Locating the sensor in very close proximity to the fluid within the channel enables high resolution sensing. It has been determined that if the thickness of the thin layer is relatively thick, for example at or above around 160 μm, the sensitivity of the sensor remains limited. But if a much thinner layer is used, the sensitivity of the sensor may increase exponentially. For example, using an ultra thin layer having a thickness of no more than around 100 μm provides a new generation of sensors that can detect new fluid parameters in the channel that are not possible to detect with thicker layers, for example with thicknesses of 160 um and above.

Figure 26:
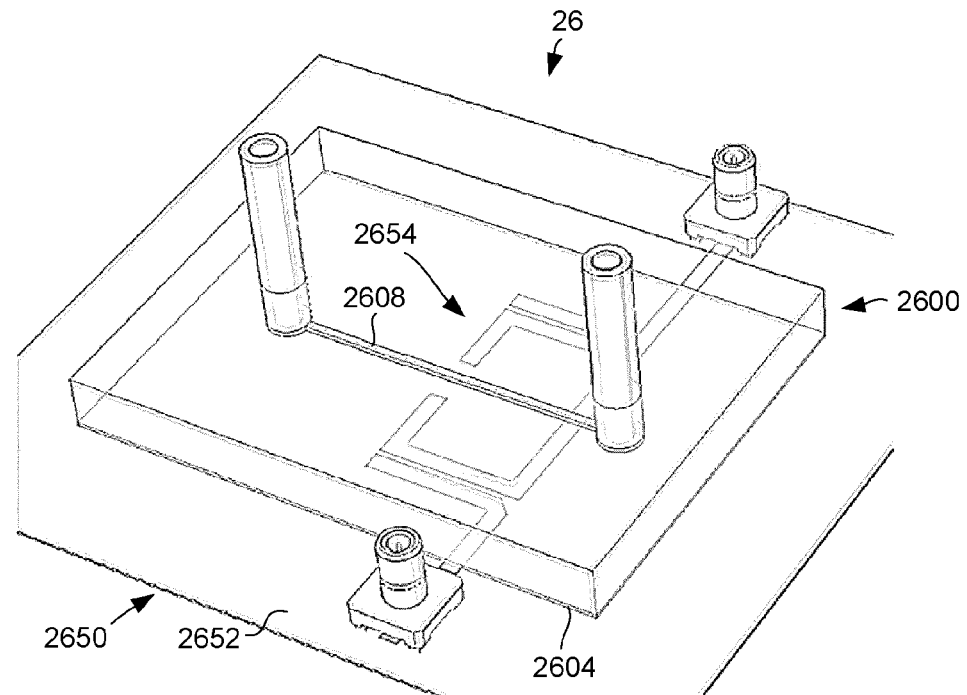
FIG. 26 is a microwave sensor with improved sensitivity comprising a very thin, substantially rigid layer in the microfluidic chip.

An example embodiment is shown in FIG. 26, where sensing apparatus 26 is similar in many respects to sensing apparatus of FIG. 1. Notable differences include that microfluidic chip 2600 does not have a deformable membrane or a chamber defined in microfluidic channel 2608. Rather, here thin layer 2604 is substantially rigid and therefore does not deform in response to fluid pressure in channel 2608. It is acknowledged that no material is absolutely rigid. The term "rigid" used herein is used in its normal sense and thus does not mean absolutely rigid.

In this embodiment, the most sensitive zone of the microwave resonator sensor is immediately adjacent to resonator. In previous sensors, a thick glass separation membrane prevents the sample material from flowing close enough to the sensitive zone and limits the sensitivity of the device in characterizing the sample. In contrast, the ultra-thin planar membrane 2604 of the present sensor gives greater spatial overlap between the sample material within channel 2608 of microfluidic chip 2600 and the electric field of sensor 2654. This allows greater sensitivity (e.g. exponentially increase) in the characterization of the sample using for example, frequency shift analysis, or amplitude shift analysis. In another embodiment, good sample/electric field spatial overlap may also be achieved using a separation membrane with a non-planar shape where the membrane has a concavity into the zone of the electric field.

In an embodiment, thin layer 2604 may have a thickness within the range of 10 um to 100 um. In an embodiment, thin layer 2604 may be comprised substantially of a rigid material(s), such as but not limited to PMMA, glass, quartz, or sapphire. In an embodiment, resonator 2654 is disposed no more than 50 um from thin layer 2604. In an embodiment, the resonator may be disposed in physical contact with thin layer 2604. In an embodiment, the microwave resonator is retained in position relative to the microfluidic chip with a releasable connection, for example without bonding. This non-bonding style may help to displace the microfluidic channel respect to the sensitive zone of the resonator which provides a capability of detecting several different locations of the channels with one single electrode.

Figure 27:
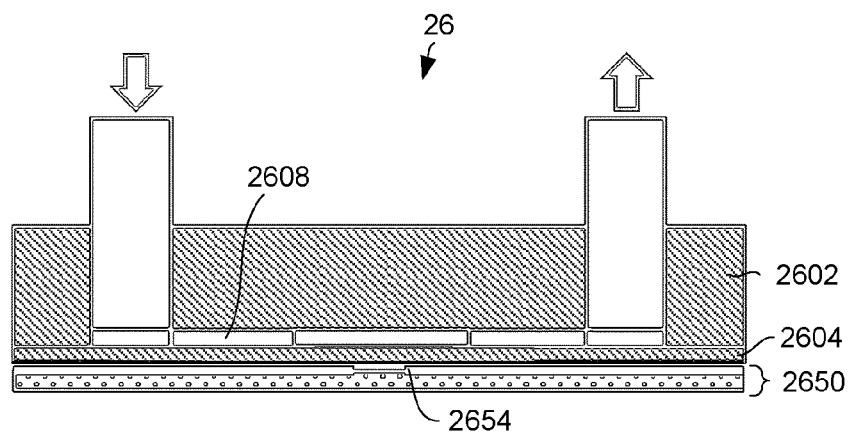
FIG. 27 is a cross sectional view of a sensing apparatus similar to the one of FIG. 26.

FIG. 27 is a cross sectional view of sensing apparatus 26. The embodiment of FIG. 27 is similar in many respects to the embodiment of sensing apparatus of FIG. 2. Notable differences include the absence of a deformable membrane, and the absence of a gap between thin layer 2604 and resonator 2654. Rather, in this embodiment, it is desirable to position resonator 2654 as close as possible to channel 2608 to achieve a high level of sensitivity. Here, resonator 2654 is arranged to generate an electromagnetic field in the region of thin layer 2604 and channel 2608. As mentioned above, the permittivity of the medium adjacent the sensor 2654, which includes the permittivity of the sample in the channel 2608, may be sensed and used to characterize the sample.

Example Rigid Ultra-Thin Layer Sensor Application

The following is a description of a non-limiting embodiment of a microwave sensor for fluid sensing having a substantially rigid and thin layer disposed between the resonator sensor and the microfluidic channel. The sensor is used to detect the presence and concentration of bacteria in the fluid within the channel. A difference of permittivity of bacteria relative to control media results in a detectable frequency shift in the presence of bacteria. It is to be appreciated that sensor 26 may be used in different applications and for sensing other parameters of the sample under test.

In this experiment, the bacteria strain utilized in this work is wild-type strain DA5438 (*E. Coli* MG1655). In preparation for analysis, the *E. Coli* from 50% glycerol stocks at −80° C. were inoculated into 50 mL Müller-Hinton (MH) growth medium and incubated (37 degrees C.; shaking at 170 RPM) for about 10 hrs. The pH was measured for each sample and adjusted to value 7 by a mixture of M sodium phosphate dibasic and sodium phosphate monobasic. The bacteria were stored in 4 degrees C. while they were not in use to retard their growth to ensure the most accurate representation of each dilution factor. The samples were brought to room temperature prior the use through dilution in MH medium. Prior to any experiment, 2-3 mL of MH medium was left at room temperature for about 3 min to register room temperature.

The microfluidic chip features a simple straight channel produced from 10:1 ration of polydimethylsiloxane (PDMS) to curing agent. The channel was 2 mm wide, 0.17 mm high and 23 mm long, and capable of handling 7.82 μL of fluid. The PDMS layer was plasma bonded to different thickness of rigid glass of the same material, after being cleaned with acetone and nitrogen. The minimum thickness of 20 um ultra-thin glass had also enough mechanical rigidity, preserving the shape and size of the PDMS-based microchannel over long experiments after the bonding had occurred, given the fact that the microwave sensing technology is very sensitive to spatial variations. The thin glass layers brought the fluid inside the chip as close as possible to the resonator, to allow for greater accuracy in measurement, while maintaining the robustness of the design.

A microstrip planar ring resonator sensor was implemented on a high frequency substrate. The substrate was covered by two copper layers on its top and bottom surface with the thickness and conductivity of 35 μm and 58 $MSm^{-1}$, respectively. The substrate had a thickness of 0.79 mm with the permittivity of 2.2+/−0.02 and loss tangent of 0.0009. The electrical measurements of the bare resonator and the resonator placed underneath the microfluidic channel were taken before the start of the experiments with bacteria. The microfluidic chip was secured onto the resonator using double-sided tape. Syringes were filled with MH medium and connected to the microfluidic chip using Tygon tubing. The cables and tubing were secured through duct tape to limit the movement and mechanical drift of data.

The fluid was introduced into the microchannel while the vector network analyzer (VNA) system was running. The syringes were set onto the syringe pump calibrated to the flow rate of 50 µL/min. Three measurements were recorded from the VNA with one-minute time intervals for each thickness of the glass layer. The room temperature was set to 20 degrees C. for all sets of experiments. Temperature variations would require the sensor to be calibrated for the testing temperature. The VNA was brought to operating temperature and calibrated within the frequency span of 2-3 GHz at this temperature using 2001 steps in transmission mode, with an IF bandwidth of 1 kHz. The resonant frequency and amplitude were extracted through S21 parameters for different chips. The heat generated at these settings was miniscule and may be neglected at any portion of the analysis. The response from the VNA was nearly immediate but measurements were taken at 1-minute intervals to ensure homogenous distribution of bacterial fluid within the chip. It is noted that no bacteria were found adhered to PDMS surfaces and this is important, in this particular embodiment, to maintain the homogenous representation of each dilution factor. The flowrate of 50 µL/min through the channel was high enough to produce enough sheer to prevent cells from sticking to the channel walls.

Figure 28:
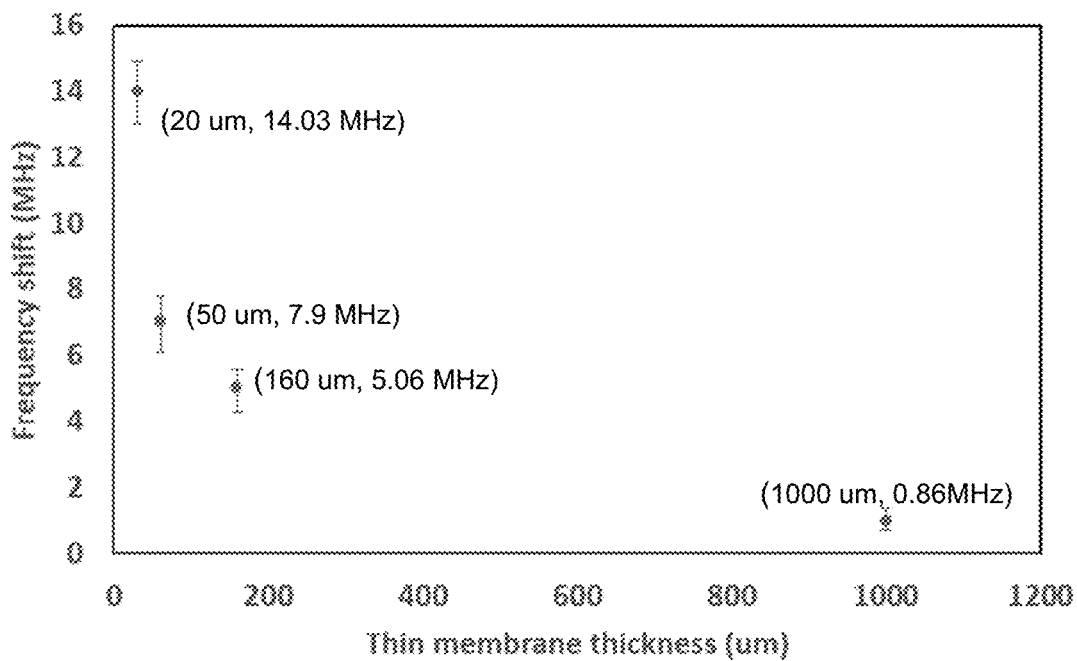
FIG. 28 is a graph showing frequency shift of a resonator sensor versus thin membrane thickness in an example embodiment.

The difference of permittivity of bacteria relative to control media results in a detectable frequency shift in the presence of bacteria. FIG. 28 shows that for the same bacterial concentrations, the measured frequency shift is significantly higher when using a 30 pm membrane, indicating a much higher sensitivity for sensor 26 compared to other sensors having thicker membrane layers.

FIGS. 29-32 show some other embodiments.

Figure 29:
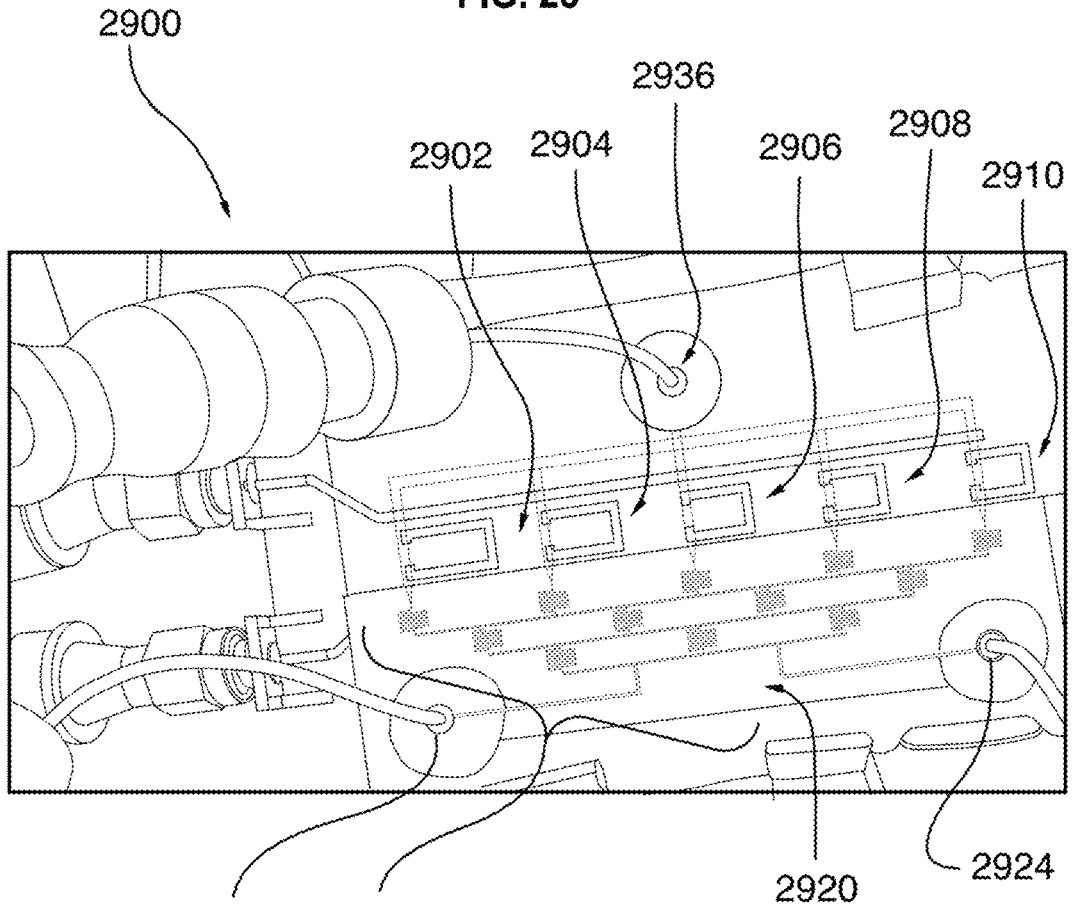
FIG. 29 is a sensing apparatus for use in characterizing 5 different fluid flows simultaneously using 5 rigid layer sensors.

FIG. 29 shows an embodiment of a microfluidic system 2900 arranged for use in characterizing 5 different fluid flows simultaneously using 5 rigid layer microwave resonator sensors 2902, 2904, 2906, 2908, 2910 according to the present disclosure. Microfluidic chip 2920 comprises inlets 2922, 2924 and outlet 2926. A liquid a with c=0 concentration of target molecule is introduced at inlet 2922 while a liquid a with c=1 concentration of target molecule is introduced at inlet 2924. The liquids inlets 2922 and 2924 are mixed together through mixer network 2930 and then mixed solutions with different concentrations ranging from c=0 to c=1 are generated at 5 different channels each of which extends over one of resonators 2902, 2904, 2906, 2908, 2910. The resonators may be used to detect different concentrations of the target molecule. This and similar embodiments may be used for the detection of a target molecule in a liquid within a complex fluid such as in biofluids.

Figure 30:
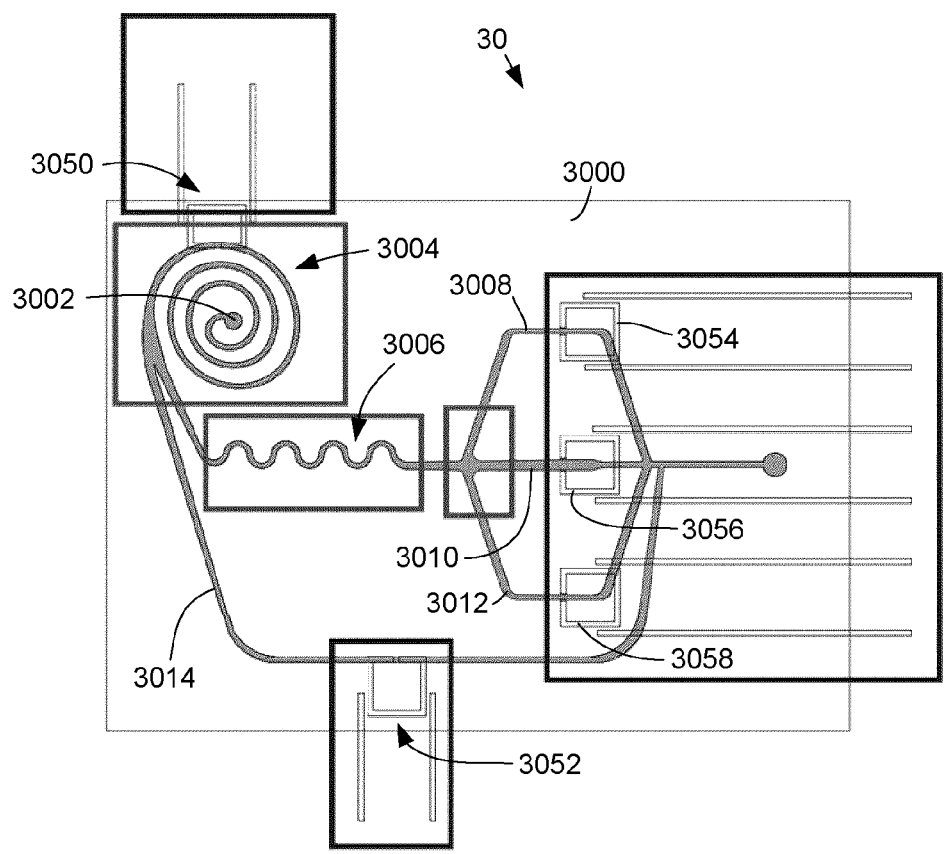
FIG. 30 is a microfluidic system, having resonator sensors, for separating particles from a medium and directing them through specific channels.

FIG. 30 shows an embodiment of a microfluidic sensing system 30 according to the present disclosure. This microfluidic system may be used for separating particles from a medium, such as liquid or gas, and directing them through specific channels. In an embodiment, system 30 may be used for detecting the concentration of asphaltene and wax particles in heavy crude oil. In this embodiment, fluid flows into microfluidic device 3000 system via inlet 3002. System 30 separates bigger particles, for example those that are bigger than 100 um, from the medium in a centrifuge 3004 and then the remaining mixture, for example that having particles smaller than 100 um, is directed through a focusing and splitting system 3006. The medium is then guided into one of several channels 3008, 3010, 3012 for sensing. Fluid with the bigger particles is directed into bypass channel 3014. System 3006 focuses the concentration of particles of interest in the center channel 3010. The concentration of the particles of interest in channels 3008 and 3012 will typically be lower, and often will be zero or close to zero.

A microwave sensing system comprised of several rigid layer sensors 3050, 3052, 3054, 3056, 3058, is responsible for sensing the mixture and particles in different locations, here in 5 locations. Sensor 3050 may be used to sense the fluid close to the inlet 3002 in centrifuge 3004. Sensor 3052 may be used to sense the fluid containing the large particles in bypass channel 3014. Sensors 3054, 3056, 3058 may be used to sense the fluid in channels 3008, 3010, 3012, respectively, to determine the concentrations of the particles in each of the channels. A comparative analysis may be used to measure the amount of particles in middle channel 3010 relative to channels 3008, 3012.

Through comparative analysis and based on the preloaded calibration curves into the analysis system software, it can detect the concentration of a specific particle in the media.

Figure 31:
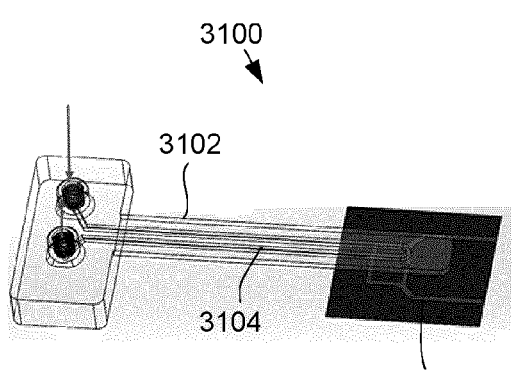
FIG. 31 is a sensing apparatus comprising a microfluidic sensor having a cantilever with buried microfluidics.

FIG. 31 shows an embodiment of a microfluidic sensor 3100 comprising a small cantilever 3102 with buried microfluidics, meaning a channel 3104 defined therein. A gap between the microcantilever and microwave sensor 3106 may change due to weight of liquid in channel 3104. Cantilever 3102 may be made of three thin layers of PDMS (e.g. each layer 40 um). The passage of fluid through channel 3104 changes the weight of cantilever 3102 and results in its deformation toward resonator 3106. Also the fluid materials may interact with the surface of channel and generate surface stress, and as the result cantilever 3102 may deflect and its deflection may be sensed by resonator 3106. Such a sensor 3100 may be used in any suitable application, such as in biosensing.

Figure 32:
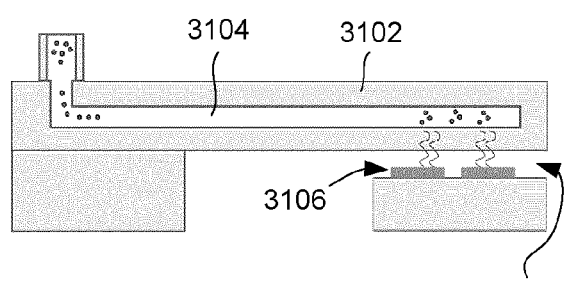
FIG. 32 is a cross sectional view of the apparatus of FIG. 31.

FIG. 32 is a cross sectional view of the device of FIG. 31. As mentioned above, gap 3108 between cantilever 3102 and microwave sensor 3106 may change due to weight of liquid in channel 3104.

Devices and methods according to the present disclosure may be highly compatible with several applications in energy and biomedical engineering, and particularly for microfluidic-based lab-on-chips, micro-bioreactors and organ-on-chips platforms. The present sensor may be used for long-term detection of flow rate in real-time. Further, the present sensor may be used in a variety of other applications including but not limited to flow cytometry, cell sorting, nanoparticle synthesis, and droplet control within microfluidics. Moreover, although some embodiments are described as being arranged for sensing of flow rate, this is not meant to be limiting. The present teachings apply to sensors and methods configured for sensing other physical characteristics of a fluid in a channel, including but not limited to chemical concentration, chemical formulation, presence of a certain type of molecule or other substance, etc.

Figure 33:
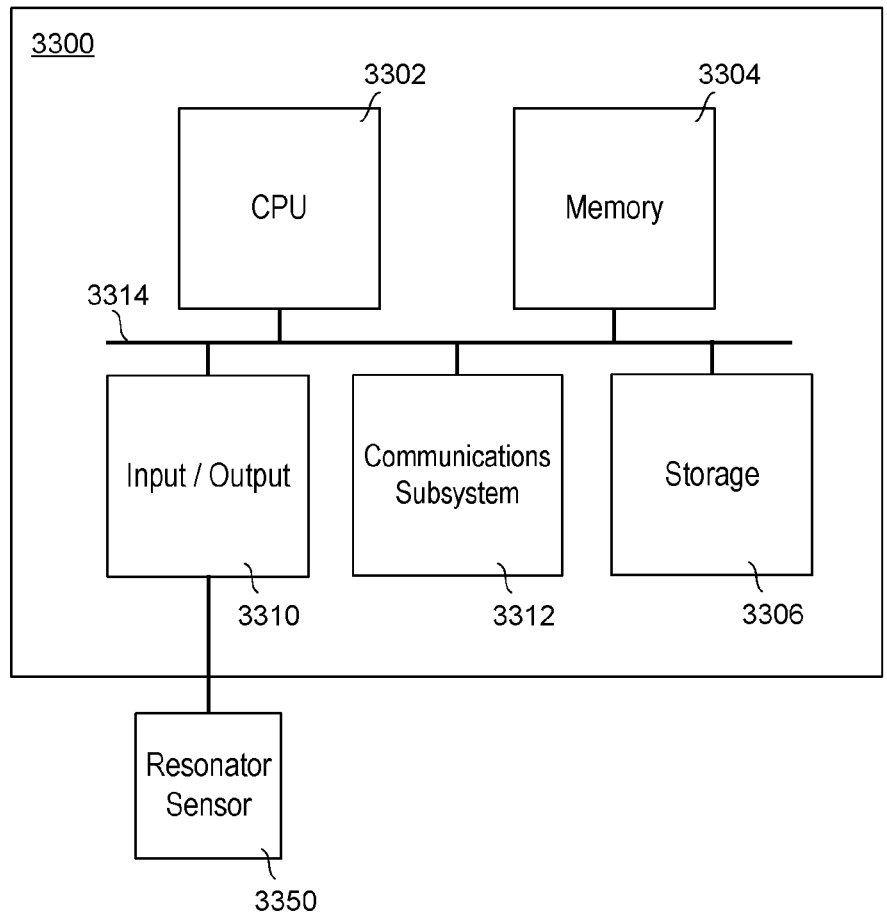
FIG. 33 is a block diagram of an example computerized system that may be used in implementing one or more aspects or components of an embodiment.

FIG. 33 is a block diagram of an example computerized system 3300 that may be used in implementing one or more aspects or components of an embodiment according to the present disclosure. For example, system 3300 may be used to implement a computing device, such as an analyzer, to be used with a sensor or method of the present disclosure.

Computerized system 3300 may include one or more of a central processing unit (CPU) 3302, memory 3304, a mass storage device 3306, an input/output (I/O) interface 3310, and a communications subsystem 3312. One or more of the components or subsystems of computerized system 3300 may be interconnected by way of one or more buses 3314 or in any other suitable manner.

The bus 3314 may be one or more of any type of several bus architectures including a memory bus, storage bus, memory controller bus, peripheral bus, or the like. The CPU 3302 may comprise any type of electronic data processor. The memory 3304 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 3306 may comprise any type of storage device configured to store data, programs, and other information and to make the data, programs, and other information accessible via the bus 3314. The mass storage device 3306 may comprise one or more of a solid state drive, hard disk drive, a magnetic disk drive, an optical disk drive, or the like. In some embodiments, data, programs, or other information may be stored remotely, for example in the "cloud". Computerized system 3300 may send or receive information to the remote storage in any suitable way, including via communications subsystem 3312 over a network or other data communication medium.

The I/O interface 3310 may provide interfaces to electrically connect one or more other devices, such as a microwave resonator sensor device 3350 of a sensing apparatus according to the present disclosure, to the computerized system 3300. Furthermore, additional or fewer interfaces may be utilized. For example, one or more serial interfaces such as Universal Serial Bus (USB) (not shown) may be provided.

Computerized system 3300 may be configured to apply an electrical signal to the resonator 3350 to cause resonator 3350 to generate a microwave frequency electromagnetic field, as previously described. Further, system 3300 may be configured to receive signals from resonator 3350, for example to measure an electrical parameter of the resonator. Further, data for use in mapping measured electrical parameters, such as resonant frequencies or resonant amplitudes, to flow rates or other metrics such as biological or chemical characteristics may be predetermined and stored in system 3000, for example in memory 3304 or in storage 3306.

A communications subsystem 3312 may be provided for one or both of transmitting and receiving signals. Communications subsystems may include any component or collection of components for enabling communications over one or more wired and wireless interfaces. These interfaces may include but are not limited to USB, Ethernet (e.g. IEEE 802.3), high-definition multimedia interface (HDMI), Firewire™ (e.g. IEEE 1394), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, and dedicated short range communication (DSRC). Communication subsystem 3312 may include one or more ports or other components (not shown) for one or more wired connections. Additionally or alternatively, communication subsystem 3312 may include one or more transmitters, receivers, and/or antenna elements (none of which are shown)

Computerized system 3300 of FIG. 33 is merely an example and is not meant to be limiting. Various embodiments may utilize some or all of the components shown or described. Some embodiments may use other components not shown or described but known to persons skilled in the art.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

In addition, the steps and the ordering of the steps of methods described herein are not meant to be limiting. Methods comprising different steps, different number of steps, and/or different ordering of steps are also contemplated.

For simplicity and clarity of illustration, reference numerals may have been repeated among the figures to indicate corresponding or analogous elements. Numerous details have been set forth to provide an understanding of the embodiments described herein. The embodiments may be practiced without these details. In other instances, well-known methods, procedures, and components have not been described in detail to avoid obscuring the embodiments described.

The above-described embodiments are intended to be examples only. Alterations, modifications and variations can be effected to the particular embodiments by those of skill in the art without departing from the scope, which is defined solely by the claims appended hereto.

The invention claimed is:

1. An apparatus for sensing a fluid, comprising:
a microfluidic chip defining a microfluidic channel for receiving the fluid, the channel comprising a chamber, the chip having a deformable membrane disposed at the chamber and defining part of the channel, wherein the deformable membrane is outwardly deformable in response to loading from interaction of the membrane with the fluid; and
a microwave resonator arranged to generate an electromagnetic field at the deformable membrane, the resonator spaced apart from the microfluidic chip and facing the deformable membrane thereby defining a gap between the resonator and the membrane to accommodate the outwardly deformation of the membrane.

2. The apparatus of claim 1, wherein the deformable membrane is outwardly deformable in response to pressure or shear stress resulting from interaction of the membrane with the fluid within the channel.

3. The apparatus of claim 1, further comprising an analyzer arranged to measure an electrical parameter of the microwave resonator in the presence of the generated electromagnetic field, where the measured electrical parameter varies in relation to an amount of deformation of the deformable membrane caused by the loading.

4. The apparatus of claim 3, wherein the analyzer is further arranged to determine a characteristic of the fluid within the microfluidic channel based on the measured electrical parameter.

5. The apparatus of claim 4, wherein the characteristic is at least one of a physical, chemical, or biological characteristic of the fluid within the microfluidic channel.

6. The apparatus of claim 3, wherein the electrical parameter is resonance frequency of the resonator.

7. The apparatus of claim 1, wherein the microfluidic chip comprises a first layer joined to a membrane layer, where the microfluidic channel is defined between the first layer and the membrane layer, and where the membrane layer forms the deformable membrane.

8. The apparatus of claim 1, wherein the deformable membrane is comprised substantially of polydimethylsiloxane (PDMS).

9. The apparatus of claim 1, wherein a width of the deformable membrane within the range of 1 mm to 10 mm.

10. The apparatus of claim 1, wherein the deformable membrane has a thickness within the range of 10 μm to 150 μm.

11. The apparatus of claim 1, wherein a ratio of a width of the deformable membrane to a thickness of the deformable membrane is within the range of 30:1 to 60:1.

12. The apparatus of claim 1, wherein the gap between the resonator and the deformable membrane in a non-deformed state is within the range of 200 μm to 500 μm.

13. The apparatus of claim 1, further comprising:
a second microwave resonator disposed proximate the microfluidic channel and away from the deformable membrane; and
an analyzer arranged to measure an electrical parameter of the microwave resonator in the presence of the generated electromagnetic field, where the measured electrical parameter varies in relation to an amount of deformation of the deformable membrane caused by the loading, and the analyzer further arranged to measure a permittivity of the fluid within the channel using the second resonator.

14. The apparatus of claim 13, wherein the analyzer is arranged to determine a flow rate of the fluid within the microfluidic channel based on the measured electrical parameter and the measured permittivity.

15. The apparatus of claim 1, wherein the microwave resonator is retained in position relative to the microfluidic chip without bonding.

16. A method of sensing a fluid, the method comprising:
providing the fluid in a microfluidic channel of a microfluidic chip, the channel comprising a chamber, the chip having a deformable membrane disposed at the chamber and defining part of the channel, wherein the deformable membrane is outwardly deformable in response to loading from interaction of the membrane with the fluid;
generating a microwave frequency electromagnetic field at the deformable membrane using a microwave resonator, the resonator spaced apart from the microfluidic chip and facing the deformable membrane thereby defining a gap between the resonator and the membrane to accommodate the outwardly deformation of the membrane; and
measuring an electrical parameter of the microwave resonator in the presence of the generated electromagnetic field, where the measured electrical parameter varies in relation to an amount of deformation of the deformable membrane caused by the loading.

17. The method of claim 16, wherein the deformable membrane is outwardly deformable in response to pressure or shear stress resulting from at least one of a physical, chemical or biological characteristic of the fluid, or interaction of the membrane with the fluid within the channel.

18. The method of claim 16, wherein the microfluidic chip comprises a first layer joined to a membrane layer, where the microfluidic channel is defined between the first layer and the membrane layer, and where the membrane layer forms the deformable membrane.

19. The method of claim 16, wherein a width of the deformable membrane within the range of 1 mm to 10 mm.

20. The method of claim 16, wherein the deformable membrane has a thickness within the range of 10 μm to 150 μm.

21. The method of claim 16, wherein a ratio of a width of the deformable membrane to a thickness of the deformable membrane is within the range of 30:1 to 60:1.

22. The method of claim 16, further comprising:
providing a second microwave resonator disposed proximate the microfluidic channel and away from the deformable membrane; and
measuring a permittivity of the fluid within the channel using the second resonator; and
using the measured permittivity and the measured electrical parameter to determine a physical characteristic of the fluid.

23. An apparatus for sensing a fluid, comprising:
a microfluidic chip defining a microfluidic channel for receiving the fluid, the chip having a layer defining part of the channel, the layer having a thickness within the range of 10 um to 100 um; and
a microwave resonator arranged to generate an electromagnetic field at the layer, the resonator disposed proximate the layer.

24. The apparatus of claim 23, wherein the resonator is disposed in physical contact with the layer.

25. The apparatus of claim 23, further comprising an analyzer arranged to measure an electrical parameter of the microwave resonator in the presence of the generated electromagnetic field and the fluid within the channel.

* * * * *